US012649462B1

(12) United States Patent
Chang et al.

(10) Patent No.: US 12,649,462 B1
(45) Date of Patent: Jun. 9, 2026

(54) VEHICLE TRAJECTORY TREE SEARCH

(71) Applicant: Zoox, Inc., Foster City, CA (US)

(72) Inventors: Yan Chang, Mountain View, CA (US);
Gowtham Garimella, Hayward, CA
(US); Marin Kobilarov, Baltimore,
MD (US); Gary Linscott, Seattle, WA
(US)

(73) Assignee: Zoox, Inc., Foster City, CA (US)

( * ) Notice: Subject to any disclaimer, the term of this
patent is extended or adjusted under 35
U.S.C. 154(b) by 574 days.

(21) Appl. No.: 17/900,332

(22) Filed: Aug. 31, 2022

(51) Int. Cl.
*B60W 30/095* (2012.01)
*B60W 30/12* (2020.01)
(Continued)

(52) U.S. Cl.
CPC ........ *B60W 30/0956* (2013.01); *B60W 30/12*
(2013.01); *B60W 30/18163* (2013.01);
(Continued)

(58) Field of Classification Search
CPC ............. B60W 30/0956; B60W 30/12; B60W
30/18163; B60W 50/00; B60W
2050/0028; B60W 2555/60; B60W
30/095; B60W 30/18159; B60W 30/16;
B60W 30/162; B60W 30/165; B60W
30/17; B60W 30/182; B60W 50/082;
G05D 1/0061; G05D 1/0088; G05D
1/021; G05D 1/0214; G05D 1/0221;
G05D 1/0223
(Continued)

(56) References Cited

U.S. PATENT DOCUMENTS

2019/0101919 A1* 4/2019 Kobilarov .............. G05D 1/617
2020/0132477 A1* 4/2020 Averilla ............. G01C 21/3673
(Continued)

FOREIGN PATENT DOCUMENTS

KR 101339480 B1 * 12/2013 ............ H04W 40/24

OTHER PUBLICATIONS

Changxi You, Jianbo Lu, Dimitar Filev, Panagiotis Tsiotras; Advanced
planning for autonomous vehicles using reinforcement learning and
deep inverse reinforcement learning; Jan. 15, 2019; Robotics and
Autonomous Systems, vol. 114, Apr. 2019, pp. 1-18 (Year: 2019).*

*Primary Examiner* — Rachid Bendidi
*Assistant Examiner* — Neit J. Nieves Flores
(74) *Attorney, Agent, or Firm* — Lee & Hayes, P.C.

(57) ABSTRACT

Techniques are discussed herein for generating trajectories
for controlling motion and/or other behaviors of vehicles in
complex driving environments. In certain examples, a search
algorithm may be used to determine and evaluate a set of
possible candidate actions for a vehicle, including candidate
actions based on a predetermined exploration policy and
additional candidate actions based on machine learned mod-
els that output predicted behaviors for the vehicle based on
the current driving environment. Costs associated the vari-
ous candidate actions may be evaluated based on state
transition costs and/or future state predictions of the driving
environment. Certain examples may include a tree search
using a combination of predetermined heuristic candidate
actions and adaptive-learning candidate actions at various
nodes within a tree structure representing a driving route
from a current vehicle state to an intended end state.

20 Claims, 12 Drawing Sheets

(51) Int. Cl.
   *B60W 30/18* (2012.01)
   *B60W 50/00* (2006.01)

(52) U.S. Cl.
   CPC ..... *B60W 50/00* (2013.01); *B60W 2050/0028* (2013.01); *B60W 2555/60* (2020.02)

(58) Field of Classification Search
   USPC .......................................................... 701/25
   See application file for complete search history.

(56) References Cited

U.S. PATENT DOCUMENTS

| | | | |
|---|---|---|---|
| 2020/0174481 A1* | 6/2020 | Van Heukelom | G01C 21/3407 |
| 2021/0020045 A1* | 1/2021 | Huang | G05D 1/692 |
| 2021/0046924 A1* | 2/2021 | Caldwell | B60W 30/09 |
| 2022/0169278 A1* | 6/2022 | Refaat | G06F 18/214 |
| 2022/0398283 A1* | 12/2022 | Mannor | G06N 3/006 |
| 2023/0041975 A1* | 2/2023 | Caldwell | B60W 60/0027 |

* cited by examiner

200

CANDIDATE ACTION
(POLICY-BASED) 210

CANDIDATE ACTION
(MACHINE LEARNED MODEL)
212

CANDIDATE ACTION
(POLICY-BASED) 208

CANDIDATE ACTION
(POLICY-BASED) 204

CANDIDATE ACTION
(POLICY-BASED) 206

VEHICLE STATE 202

AUTONOMOUS
VEHICLE 102

Figure 4A:
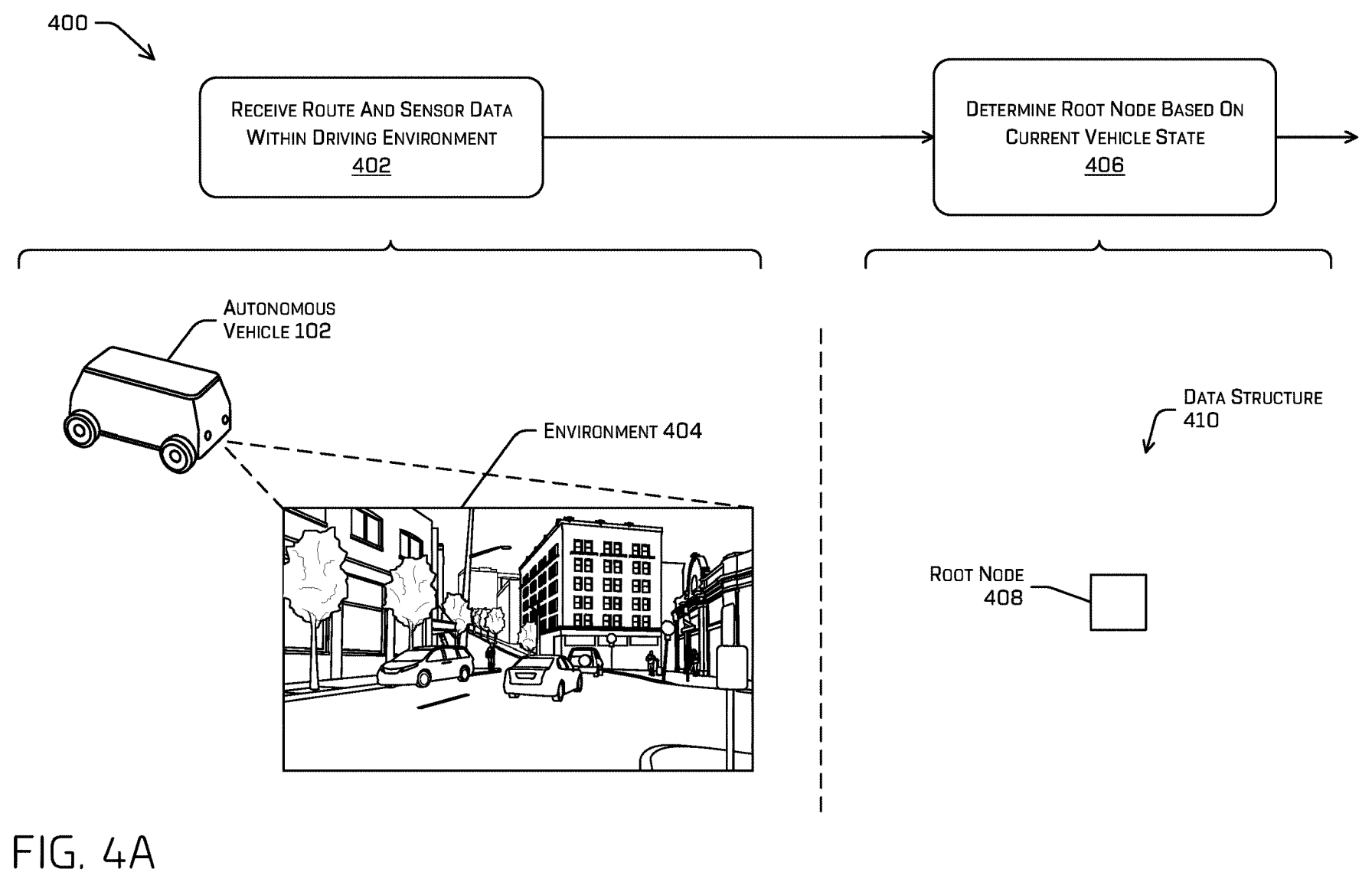

400

RECEIVE ROUTE AND SENSOR DATA
WITHIN DRIVING ENVIRONMENT
402

DETERMINE ROOT NODE BASED ON
CURRENT VEHICLE STATE
406

DATA STRUCTURE
410

ROOT NODE
408

AUTONOMOUS
VEHICLE 102

ENVIRONMENT 404

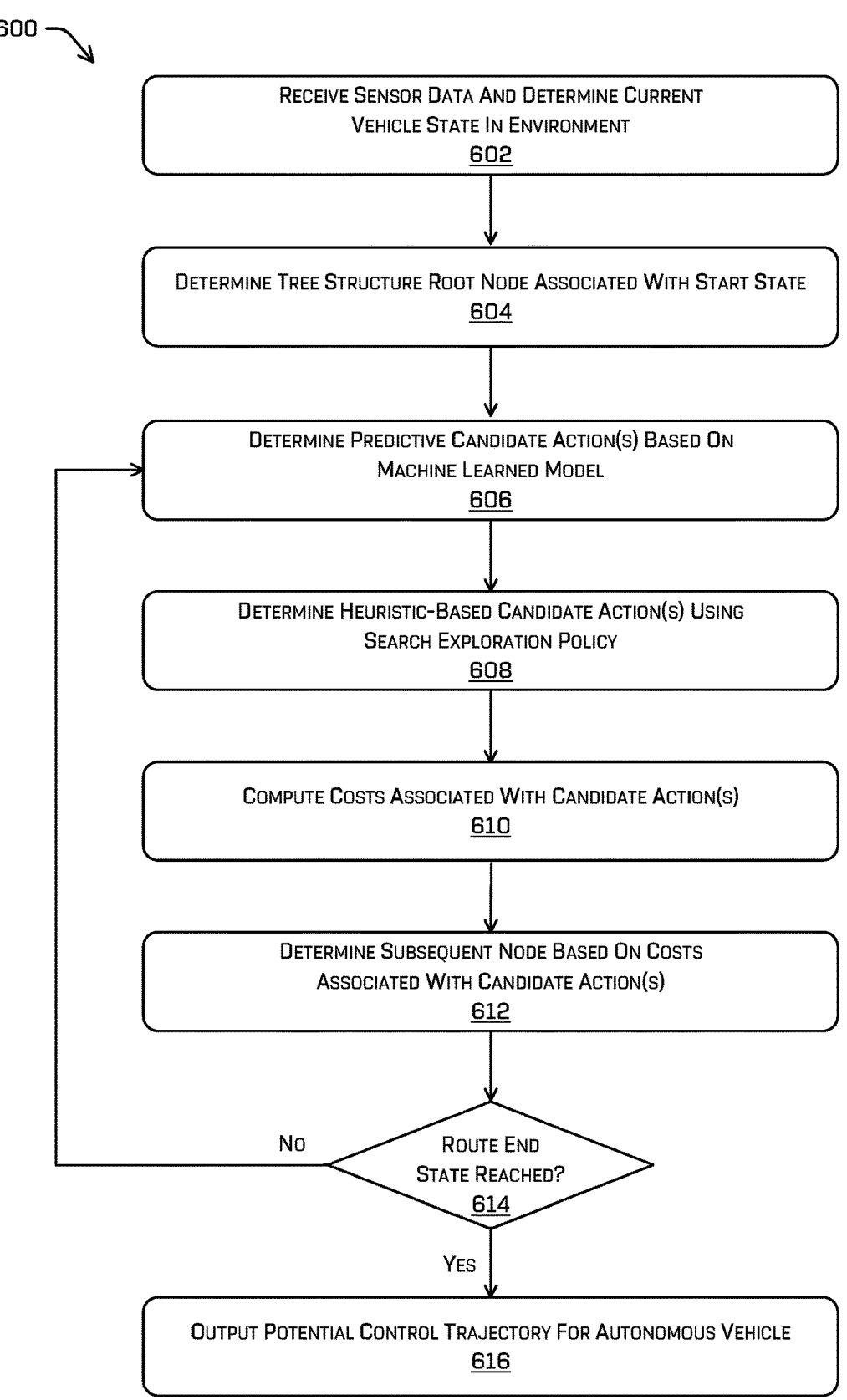

RECEIVE SENSOR DATA AND DETERMINE CURRENT
VEHICLE STATE IN ENVIRONMENT
602

DETERMINE TREE STRUCTURE ROOT NODE ASSOCIATED WITH START STATE
604

DETERMINE PREDICTIVE CANDIDATE ACTION(S) BASED ON
MACHINE LEARNED MODEL
606

DETERMINE HEURISTIC-BASED CANDIDATE ACTION(S) USING
SEARCH EXPLORATION POLICY
608

COMPUTE COSTS ASSOCIATED WITH CANDIDATE ACTION(S)
610

DETERMINE SUBSEQUENT NODE BASED ON COSTS
ASSOCIATED WITH CANDIDATE ACTION(S)
612

ROUTE END
STATE REACHED?
614

No

YES

OUTPUT POTENTIAL CONTROL TRAJECTORY FOR AUTONOMOUS VEHICLE
616

FIG. 6

VEHICLE TRAJECTORY TREE SEARCH

BACKGROUND

Autonomous driving may benefit from computing systems capable of determining driving paths and navigating along routes from an initial location toward a destination. For example, autonomous and semi-autonomous vehicles may utilize systems and components to traverse through driving environments including other objects, such as moving or stationary vehicles (autonomous or otherwise), pedestrians, buildings, etc. When traversing through such an environment, the vehicle may determine a trajectory based on sensor data from the perception systems of the vehicle, as well as map data of the environment. A planning system within an autonomous or semi-autonomous vehicle may determine a trajectory and a corresponding set of actions for the vehicle to take to navigate in an operating environment. Trajectory selection techniques may take into account considerations such as kinematic and/or dynamic (kino-dynamic) feasibility of the vehicle, passenger safety and comfort, driving efficiency, route continuity, and the like. Additionally, the trajectory and actions for a vehicle may be determined based in part on avoiding other objects present in the environment. For example, an action may be generated by a planning system to yield to a pedestrian, to change a lane to avoid another vehicle in the road, etc. The perception systems of the vehicle utilize sensor data to perceive the environment, which also enables the planning system to determine an effect of a detected object on the potential actions for the vehicle. However, the complexity of such environments may preclude efficient determination of optimized trajectories for the vehicle, especially as applied in ever more complicated scenarios.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIGS. 4A-4C illustrate a pictorial flow diagram of an example process for generating a trajectory for controlling a vehicle using or tree search that includes evaluating candidate actions based on a predictive machine learned model and candidate actions based on a search exploration policy, in accordance with one or more examples of the disclosure.

FIG. 6 is a flow diagram illustrating an example technique for determining a trajectory using a tree search including predictive model-based candidate actions, in accordance with one or more examples of the disclosure.

DETAILED DESCRIPTION

Figure 1:
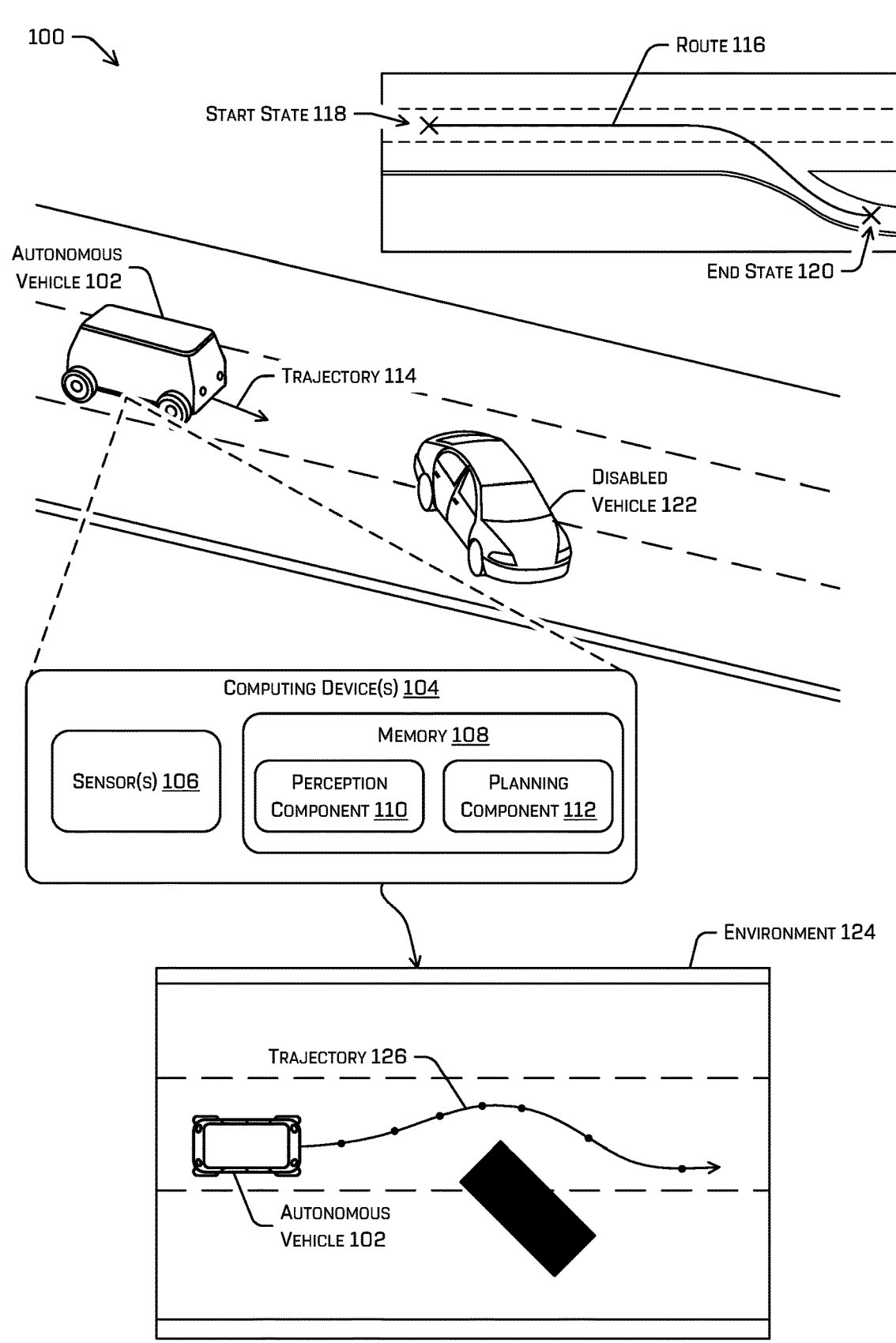
FIG. 1 illustrates an autonomous vehicle and an example scenario in which a driving trajectory is determined to control the autonomous vehicle along a route in an environment.

This application relates to determining driving trajectories for vehicles between various states (which may include, for example, positions, velocities, accelerations, steering angles, yaw rates, and the like) in a driving environment. Various techniques described herein may include using tree searches and/or other search algorithms to determine trajectories, during which sets of potential candidate actions for a vehicle are determined and evaluated at each node along a progression of nodes representing a driving route. At each node representing a potential vehicle state, a trajectory planning component may determine a set of candidate actions for the vehicle to be evaluated, including a number of heuristic-based candidate actions based on an exploration policy. The trajectory planning component also may determine one or more additional candidate actions based on adaptive learning models and/or other machine learning-based techniques to predict the behavior of the vehicle based on the current vehicle state and the current driving environment data. The trajectory planning component may evaluate the candidate actions using a cost function, taking into account transition costs and/or predictions of the future state of the driving environment associated with each candidate action. The trajectory planning component may generate and traverse a tree structure a tree structure by determining and evaluating candidate actions for each node in the tree structure (in which each node represents a vehicle state and/or driving environment state), selecting one or more candidate actions at each node based on costs, and iteratively creating and exploring new nodes based on the selected candidate actions, until an end node in the tree structure is reached, to determine one or more potential control trajectories from the current vehicle state to an intended end state The various examples and techniques described herein may be implemented in a number of ways to improve the operation of autonomous vehicles and the functioning of computing systems. These techniques may improve the functioning, safety, and efficiency of autonomous and semi-autonomous vehicles operating in real-world driving environments, by determining improved driving trajectories (and/or driving paths) through the environments, taking into account passenger and vehicle safety, driving efficiency, kino-dynamic feasibility of the vehicle, and various other cost-based metrics.

Various techniques described herein may include performing a tree search technique by a trajectory planner (or planning component) of a vehicle, to determine a trajectory that may be used to control the vehicle through an environment. In some examples, a tree search technique may iteratively determine sets of candidate actions, and predict future states of the environment associated with the vehicle responsive to the candidate actions. Examples of various techniques for using tree searches to the control motion of autonomous vehicles, based on determining a candidate action and predicting a future state based on the candidate action can be found, for example, in U.S. patent application Ser. No. 17/394,334, filed on Aug. 4, 2021, and titled, "Vehicle Trajectory Control Using A Tree Search," which is incorporated by reference herein in its entirety for all purposes.

In some examples, a planning component of a vehicle may perform a tree search by determining sets of candidate actions and predicted states of the environment (including various objects in the environment, such as cars, pedestrians, etc.) associated with (e.g., at least partially responsive to) the candidate actions at future time steps. For instance, during a tree search, the planning component may determine a first set of potential candidate actions for the vehicle from its current state in the environment, and a set of predicted future states of the environment at a first future time step based on the candidate actions. Based on the predicted states of the environment, the planning component may evaluate the potential candidate actions, and select one or more of the candidate actions while discarding other candidate actions. For the selected candidate action(s), the planning component may determine additional sets of candidate actions based on the predicted state(s) of the environment at the first future time step, and an additional set of predicted future states of the environment associated with the candidate actions at a second future time step, and so on, up to a time horizon or a specified number of actions.

A candidate action may indicate, for example, a trajectory for controlling motion of the vehicle, including potential actions and/or control commands for vehicle (e.g., velocity, acceleration, steering angle, yaw, etc.), as well as commands for activating emitters of the vehicle (e.g., a turn signal, a headlight, a speaker), and/or the like. In some examples, each candidate action may be associated with a different action node of a tree structure, and each predicted environment state may be associated with an associated prediction node of the tree structure. As an initial operation, the tree search may determine, based at least in part on sensor data, a current state of an environment associated with a vehicle, which may include the current state of the vehicle itself, and any number of static objects and/or dynamic objects in the environment of the vehicle. This current state of the vehicle and environment may be associated with a root node in a tree structure generated by the planning component. In some examples, the state of the environment may be indicated by a data structure (e.g., a scene embedding or encoding) associated with the root node.

Using the initial environment state associated with the root node, the planning component may commence the tree search by iteratively determining and evaluating sets of potential candidate actions for the vehicle. As noted above, a number of the potential candidate actions may be heuristic-based candidate actions that are determined by the planning component based on a predetermined search exploration policy. Examples of heuristics-based candidate actions may include driving maneuvers, such as "follow lane," "bear left/right," "lane change left/right," "execute left/right turn," "gradual stop," "immediate stop," or the like. Additionally or alternatively, examples of heuristics-based candidate actions may include fine instructions such as a velocities, velocity changes, steering angles, steering angle changes, yaw rates, yaw rate changes, and the like, that may be tracked by the vehicle controller. As described below, the planning component may use a predetermined set of heuristic-based candidate actions to be evaluated in association with a node in a tree structure. In some instances, the predetermined set of heuristic-based candidate actions may be constant across different types of environments and/or driving scenes. Additionally or alternatively, when generating the tree search, the planning component may use different sets of predetermined heuristic-based candidates for different driving scene types (e.g., highway driving, crosswalk scenes, four-way intersections, parking lots, etc.), and/or for different driving scene complexities (e.g., based on the number of agents in the environment), different geographical regions, different driving conditions (e.g., weather conditions, traffic conditions, etc.), and the like. In such cases, the planning component may maintain any number of predetermined sets of heuristic-based candidate actions, that can be applied when generating the tree structure depending on the current driving scene, complexity, region, and/or environment conditions, etc.

In some cases, the heuristics-based candidate actions used in a tree search may be predetermined based on a search exploration policy to ensure that the tree search sufficiently explores the search space of potential trajectories through the driving environment. As a result, the heuristics-based candidate actions may be referred to as predetermined candidate actions in some examples. For instance, a predetermined set of N (e.g., 1, 2, 3, 4, . . . , etc.) heuristics-based candidate actions such as "proceed in current lane position," "turn right," "turn left," and "stop," may be evaluated at each node in the tree search. In such examples, the predetermined heuristic-based candidate actions may be determined before the executing the tree search and/or before generating or beginning to traverse the tree structure. The predetermined heuristic-based candidate actions also need not take into account the current state of the driving environment, including the current vehicle state, the state of the vehicle relative to the map data (e.g., current lane position, trajectory of the lane/roadway, current speed limit, etc.), and/or need not take into account the static and/or dynamic objects perceived by the vehicle's sensors. As a result, using heuristic-based candidate actions at each node in a tree search may provide a number technical advantages when determining a trajectory for the vehicle to follow in an environment, including providing a relatively low-cost way to explore the search space robustly and quickly using various types of predetermined actions (e.g., following lane, stopping, turning left or right, etc.).

In addition to using heuristic-based candidate actions based on a predetermined search policy, the techniques described herein also may include using one or more additional candidate actions during the tree search based on the output of predictive models. As used herein, a machine-learned (ML) prediction-based candidate action may refer to an action and/or trajectory determined using adaptive learning, machine learned models, and/or other prediction-based techniques, representing a prediction of the trajectory or state of a vehicle at a future time step, based on the current state of the vehicle and/or current environment state data. In various examples, ML models and/or other prediction-based techniques may be used to predict the future trajectory and/or the future state of the vehicle, based on an initial vehicle state (e.g., vehicle position, pose, trajectory) and environment state data including map data and/or any perceived static or dynamic objects within the environment. In some cases, an adaptive learning ML model may be trained to output a predicted future trajectory and/or vehicle state, based on input including representation of a driving environment at a particular time (e.g., map data and/or a road network), perceived road and traffic signal data at the time, proximate agent data for static objects and/or dynamic agents in the environment at the time, and encoded vehicle state data including the intended destination of the vehicle at the time. In contrast to the heuristic-based candidate actions, ML prediction-based candidate actions may be determined on-the-fly during the execution of the tree search by the planning component. The ML prediction-based candidate action(s) determined for each node may be based on the predicted representation of the driving environment at the time/position associated with the node. In some examples, adaptive learning-based candidate actions may be determined based at least in part on the various techniques and systems described in U.S. patent application Ser. No. 17,351,641, filed Jun. 18, 2021, and entitled, "Active Prediction Based On Object Trajectories," and/or described in U.S. patent application Ser. No. 17,535,357, filed Nov. 24, 2021, and entitled, "Encoding Relative Object Information Into Node Edge Features. The entire contents of U.S. patent application Ser. Nos. 17,351,641 and 17,535,357 are incorporated herein by reference in their entirety for all purposes.

After determining a set of candidate actions for a node in the tree search, the planning component may use a cost function to evaluate the candidate actions and select candidate action(s) from which to continue the tree traversal. When generating the tree structure the planning component may select one or multiple of the different candidate actions associated with a node for further exploration. As described below in more detail, the planning component may select the candidate actions for further exploration in the tree structure based on costs associated with each candidate action. In some examples, determining a cost for candidate action may include projecting the candidate action into a trajectory covering the length and/or time of the driving route (or a portion thereof), and then determining any number of constitute costs (described below) based on the projection of the candidate action.

The tree search may include providing the candidate action and the initial state associated with the candidate action to a simulation and/or a prediction system of the vehicle, which may determine a predicted state of the environment based at least in part on the candidate action, including predicting how the vehicle and/or other agents in the environment may behave based on the candidate action. Additionally or alternatively, the tree search may include determining a cost associated with a candidate action, based on the predicted environment state(s) associated with the candidate action. For instance, the planning component may compute a cost associated with candidate actions based on a number of different cost types, including safety costs (e.g., based on determining potential intersection points and/or other potential interactions between the vehicle and other objects in the environment, the proximity of the vehicle to non-drivable surface(s), etc.), comfort costs (e.g., velocity, acceleration, and/or jerk metrics associated with the candidate action, etc.), route progress costs (e.g., a displacement or progress metric based on the driving route, etc.), energy efficiency costs (e.g., based on the vehicle model and/or drive system in performing the candidate action and/or trajectory, etc.), law abidance costs, and the like. In some examples, a cost may be determined for each candidate action, which may be associated with a subsequent node (or candidate action node) in the tree that represents the updated vehicle state and the predicted environment state based on the selection of the candidate action. To evaluate the cost of a candidate action node, the planning component may sum (or otherwise aggregate) the costs associated with the nodes composing a branch of the tree structure including that candidate action (e.g., the cost of the candidate action node and the cost of all parent nodes from which the candidate action node depends, tracing back to the root node).

When executing the tree search, the planning component may iteratively, at each node in the search, determine a set of candidate actions (e.g., including both heuristic-based candidate actions and adaptive learning-based predicted candidate actions), evaluate the associated candidate action nodes using one or more costs functions, and traverse the tree based on determining the one (or more) lowest-cost action nodes. The tree traversal may continue until the end state of a driving route is reached, at which time the planning component may identify one or more potential trajectories for controlling the vehicle, as the lowest-cost set(s) of nodes connecting the current vehicle state to the end state of the driving route.

As these and other examples illustrate, the techniques described herein may improve the functioning, safety, and driving efficiency of autonomous and semi-autonomous vehicles. Specifically, these techniques may result in improved trajectory determinations for vehicles to follow to traverse complex, multi-agent, and unpredictable driving environments, which can be determined more quickly and using reduced computing resources than other trajectory optimization techniques. For example, by determining and evaluating candidate actions based on ML predictive models and/or adaptive learning, the techniques herein can leverage the benefits of highly accurate ML-based predictions within a tree search that can be executed to quickly determine a trajectory for the vehicle to follow in real-time driving conditions. Further, the inclusion of both ML-based predictive candidate actions as well as predetermined heuristic-based candidate actions allows the tree search to sufficiently explore and effectively exploit the search space of potential trajectories, in order to quickly determine low-cost and/or optimal trajectories for the vehicle to follow.

Further, the techniques described herein also may reduce the number of candidate actions required for an effective tree search, by replacing a large number of predetermined heuristic-based candidate actions with a smaller number of ML-based predictive candidate actions, thereby reducing the computational and storage overhead required for the tree search. Thus, these techniques may improve the quality of candidate actions and/or paths that are explored, and also may increase the granularity with which the vehicle can be controlled and the number of scenarios that the vehicle can successfully and safely navigate, while reducing the number of actions and/or paths that are required to be explored during the tree search. In some examples, the planning component may determine the ML prediction-based candidate actions based on the output of an active prediction ML model configured to output a sequence of predicted future driving scenes over the period of time. In such examples, the active prediction ML model may be the same model used to predict the future movements and trajectories of other dynamic objects (e.g., other vehicles, pedestrians, bicycles, etc.) in the environment. As a result, by leveraging the same active prediction ML model to determine predicted candidate actions of the vehicle within the search tree, as well as predicting the future movements of other objects in the environment, any additional computational resources need by the tree search to perform the ML-based predictions may be minimized.

As described below in more detail, certain examples herein may be implemented by a trajectory planner (e.g., a planning component) of an autonomous vehicle, which may include components to generate and traverse a tree search to determine a trajectory for the vehicle to follow. However, in other examples, similar or identical techniques to those described herein may be used with other types of data structures and/or other search algorithms. In various cases, tree searches may use binary tree structures including a single ML predicted candidate action and a single heuristic-based candidate action (e.g., follow lane) for each node, or may use non-binary search trees in other examples. The various tree search algorithms that may be used may include, but are not limited to, depth-first searches and breadth-first searches, as well as tree traversal techniques using sequential and/or parallel computation, etc. In examples when other types of data structures are used (e.g., non-tree structures), other types of graph-based traversal algorithms also may be used to generate, evaluate, and traverse the nodes of the data structure to determine possible vehicle trajectories.

The techniques described herein may include performing tree searches (and/or other data structures and/or search algorithm techniques) in which the candidate actions include a combination of ML-based predicted candidate actions and heuristic-based candidate actions associated with the same node in the tree structure. In various examples, any number of ML predicted candidate actions and/or any number of heuristic-based candidate actions may be generated and evaluated for each node in the tree structure. In some cases, the planning component may determine varying numbers of candidate actions for different nodes in the tree structure based on a number of factors which may be determined in advance of the tree search or dynamically determining the execution of the tree search. As an example, the planning component may use a single ML prediction-based candidate action in some cases, but may increase the number of ML predicted-based candidate actions that are determined and evaluated for a node based on the type or complexity of the driving environment, the confidence level associated with the ML prediction of the vehicle state, and/or the location (e.g., node level) within the search tree. Similarly, the planning component may determine a default number of heuristic-based candidate actions (e.g., one candidate action, four candidate actions, ten candidate actions, etc.), but may vary the number of heuristic-based candidate actions based on the driving environment, the number and/or quality of the ML predicted candidate action(s), and/or the node level in the search tree.

Further, as described below in more detail, various types of machine learning-based techniques may be used to generate the ML predicted candidate actions in various examples. In some instances, adaptive learning techniques may be used to train and implement imitation vehicle trajectory models based on vehicle log data. For instance, an imitation model may be trained based on vehicle log data from human-controlled vehicles, log data from autonomously driven vehicles, and/or vehicle simulation data. Such imitation models may be trained and optimized to output the closest approximation of driving behaviors and/or decisions based on the training data. Additionally or alternatively, one or more reinforced learning vehicle trajectory models may be trained offline using a value maximization function. In contrast to imitation models, reinforced learning models may be trained to output a trajectory that provides an optimal value or reward with respect to metrics of predicted vehicle state and environment, such as vehicle safety metrics, passenger comfort metrics, route progress metrics, etc. Within a tree search, the ML prediction-based candidate actions associated with a node may be based on the output of one or more imitation models and/or one or more reinforced learning vehicle trajectory models.

The techniques described herein may be implemented in a number of ways. Example implementations are provided below with reference to the following figures. Although discussed in the context of an autonomous vehicle, the methods, apparatuses, and systems described herein may be applied to a variety of systems (e.g., a sensor system or a robotic platform), and are not limited to autonomous vehicles. In one example, similar techniques may be utilized in driver-controlled vehicles in which such a system may provide an indication of whether it is safe to perform various maneuvers. In various other examples, the techniques may be utilized in an aviation or nautical context, and may be incorporated into any ground-borne, airborne, or waterborne vehicle using route planning techniques, including those ranging from vehicles that need to be manually controlled by a driver at all times, to those that are partially or fully autonomously controlled.

FIG. 1 illustrates an example scenario 100 including an autonomous vehicle 102 configured to determine possible trajectories through a driving environment as described herein. In some instances, the autonomous vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 102 may be a fully or partially autonomous vehicle having any other level or classification. It is contemplated that the techniques discussed herein may apply to more than robotic control, such as for autonomous vehicles. For example, the techniques discussed herein may be applied to trajectory-finding in video games, manufacturing, augmented reality, etc.

According to the techniques discussed herein, the vehicle 102 may receive sensor data from sensor(s) 106 of the vehicle 102. For example, the sensor(s) 106 may include location sensors (e.g., a global positioning system (GPS) sensor), inertia sensors (e.g., an accelerometer sensor, a gyroscope sensor, etc.), magnetic field sensors (e.g., a compass), position/velocity/acceleration sensors (e.g., a speedometer, a drive system sensor), depth position sensors (e.g., a lidar sensor, a radar sensor, a sonar sensor, a time of flight (ToF) camera, a depth camera, and/or other depth-sensing sensor), image sensors (e.g., cameras), audio sensors (e.g., microphones), and/or environmental sensors (e.g., a barometer, a hygrometer, etc.). In some examples, a simulated sensor may correspond with at least one of the sensor(s) 106 on the vehicle 102 and in a simulation, one or more of sensor(s) 106 may be simulated. In some examples, the position of a simulated sensor may correspond with a relative position of one of the sensor(s) 106 to the vehicle 102.

The sensor(s) 106 may generate sensor data, which may be received by computing device(s) 104 associated with the vehicle 102. However, in other examples, some or all of the sensor(s) 106 and/or computing device(s) 104 may be separate from and/or disposed remotely from the vehicle 102 and data capture, processing, commands, and/or controls may be communicated to/from the vehicle 102 by one or more remote computing devices via wired and/or wireless networks.

The autonomous vehicle 102 may comprise computing device(s) 104 that may include one or more ML models and/or the navigation systems discussed herein. For example, the computing device(s) 104 comprise a memory 108 storing a perception component 110 and/or a planning component 112. As discussed below, the planning component 112 may include various components configured to execute tree search techniques, including combinations of heuristic-based candidate actions in accordance with predetermined exploration policies of the vehicle 102, and ML prediction-based candidate actions using adaptive learning to predict the future trajectories/states of the vehicle 102 within the scenario 100. The sensors 106, perception component 110 and/or planning component 112 may comprise the hardware and/or software for conducting the operations discussed herein related to trajectory determination and navigation of the autonomous vehicle 102. The various navigational systems described herein may comprise more or less components, but the perception component 110 and/or planning component 112 are given as a non-limiting example for the sake of comprehension.

In some examples, the various vehicle navigation systems and functionalities described herein may comprise processor-executable instructions stored in a memory of the computing device(s) 104 and/or accessible thereto, hardware, and/or some combination thereof (e.g., a field-programmable gate array (FPGA), application-specific integrated circuit (ASIC)).

In the example scenario 100, the autonomous vehicle 102 may be driving within an environment following a current trajectory 114. Prior to determining a subsequent trajectory for the vehicle to follow (e.g., at one or more future time steps), the autonomous vehicle 102 may receive and/or determine a route 116 including a start state 118 (e.g., the current state of the autonomous vehicle 102) and an end state 120 representing a location, velocity, and/or pose, etc., that the autonomous vehicle 102 intends to achieve. The planning component 112 may determine route 116 based at least in part on sensor data, map data, and/or based on an intended destination of a mission (e.g., received from a passenger, from a command center, etc.). As noted above, references to a "state" or "vehicle state" may include geometric state data, such as position (or location) and/or a pose (e.g., position and/or orientation/heading including yaw and steering angle) of a vehicle. Additionally, in some examples, a vehicle state may comprise any combination of a geometric state data for a vehicle, as well as temporal state data for the vehicle (e.g., a velocity, acceleration, yaw, yaw rate, steering angle, steering angle rate, etc.) and/or may include any other status data associated with the vehicle (e.g., current vehicle status data, the status of vehicle signals and operational controls, etc.).

As the autonomous vehicle 102 operates within the environment, it may receive map data of the environment (e.g., from a local or remote map system), and perception data (e.g., sensor data) from the perception component 110. The map data may include, for example, road data determined based on a map of the driving environment and/or localizing the autonomous vehicle 102 within the environment. For instance, the map data may include data associated with any number of road segments (e.g., lane segments) in the driving environment, such as the location (e.g., boundaries), size (e.g., length and width), and shape (e.g., curvature) of the road segment, as well as additional attributes of the road segment such as directionality, speed limit, gradient, road surface, etc.

The autonomous vehicle 102 also may receive sensor data from sensor(s) 106 of the autonomous vehicle 102. The perception component 110 may include one or more ML models and/or other computer-executable instructions for detecting, identifying, segmenting, classifying, and/or tracking objects from sensor data collected from the environment of the autonomous vehicle 102. For example, data generated by the perception component 110 may be used by the autonomous vehicle 102 to localize its position within the driving environment relative to the map data. In some instances, the perception component 110 also may generate drivable surface maps and/or occupancy maps indicating which areas of the environment are drivable and non-drivable surfaces, as well as which locations within the environment are occupied by objects or are free space locations that are unoccupied and in which autonomous vehicle may operate.

As the autonomous vehicle operates to reach the end state 120, it may encounter a scenario like example scenario 100 in which a trajectory planner that is reliant on a lane reference (e.g., a relative spatial designation determined based at least in part on a map and/or localizing the autonomous vehicle 102) to generate a driving path or trajectory may not accurately and/or efficiently generate a path. For example, objects and/or other obstructions, such as disabled vehicle 122, may block some or all of lanes of the roadway, and could cause a trajectory planner to stop the vehicle and/or call teleoperations because the lane does not have sufficient room for the autonomous vehicle to pass.

As discussed in the examples herein, the planning component 112 may use the map data and/or perception data, and apply trajectory optimization techniques to determine a trajectory 126 for the autonomous vehicle 102 to follow to traverse the driving environment 124. The trajectory 126 may continuously and feasibly connect the start state 118 (e.g., the current vehicle state) with the intended end state 120 of the driving route. As discussed below in more detail, the planning component 112 may determine the trajectory 126 as an improved or lowest cost (e.g., optimal) trajectory by executing a tree search including determining a combination of heuristics-based and ML prediction-based candidate actions, and evaluating the candidate actions taking into account the future predicted driving scene(s) of the environment 124, including the predicted trajectories of the autonomous vehicle 102 and the predicted trajectories/states of other agents or objects in the environment. In some cases, the trajectory 126 may represent an optimal and/or lowest-cost trajectory determined by the planning component 112 after evaluating a number of kino-dynamically feasible trajectories determined by a tree search technique, based on safety costs (e.g., potential interactions with objects/agents), passenger comfort costs, route progress costs, etc.

In this example, the planning component 112 has determined a single trajectory 126 as a selected trajectory for the autonomous vehicle 102 to traverse the environment 124. In other examples, the planning component 112 may determine any number of alternative low-cost trajectories using search trees and/or the various other techniques described herein. To implement a selected trajectory (e.g., a potential control trajectory), such as trajectory 126, the planning component 112 may generate, substantially simultaneously, a plurality of potential vehicle control actions for controlling the motion of the autonomous vehicle 102 in accordance with a receding horizon technique (e.g., 1 micro-second, half a second, multiple seconds, etc.) based at least in part on the trajectory 126. The planning component 112 may select one or more potential vehicle control actions from which to generate a drive control signal that can be transmitted to drive components of the autonomous vehicle 102, to control the vehicle to traverse the trajectory 126.

Figure 2A:
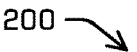
FIG. 2A illustrates an example representation of a set of candidate actions generated for a node in a tree search, in accordance with one or more examples of the disclosure.

FIG. 2A illustrates an example representation 200 of a set of candidate actions for an autonomous vehicle 102. In this example, the autonomous vehicle 102 is depicted at a vehicle state 202, which may represent a node in a tree structure used to determine a trajectory between a start state and an end state. The vehicle state 202 may include a set of parameters associated with a state of the autonomous vehicle 102, including the vehicle's position, pose, velocity, steering angle, and/or yaw rate. In some examples, the vehicle state 202 may represent a current state of the autonomous vehicle 102 (e.g., the start state 118) and may correspond to the root node of the tree search. However, in other examples, the vehicle state 202 need not be the current state of the autonomous vehicle 102, but may represent a predicted future state of the vehicle, corresponding to a non-root node further down the tree structure toward the end state of the driving route.

In this example, candidate actions 204-212 are shown representing different actions (e.g., trajectories) that the vehicle may perform from the vehicle state 202. Each candidate actions 204-212 may represent a kino-dynamically feasible trajectory that the autonomous vehicle 102 is capable of performing. For instance, candidate actions 204-212 may be associated with a vehicle speed, velocity, steering angle, and/or other vehicle trajectory parameter. In some cases, a candidate action also may include commands for activating emitters of the vehicle (e.g., turn signal, headlights, horn, speaker, etc.) and/or any other vehicle control command. The candidate actions 204-212 are depicted graphically in this example, each representing a trajectory that the autonomous vehicle 102 may follow from the vehicle state 202. In some examples, candidate actions 204-212 may be generated and stored as absolute parameter values (e.g., velocities, steering angles, etc.) while in other cases the generated and stored relative to the parameters of the vehicle state 202 (e.g., a velocity difference, a steering angle difference, etc.).

As described above, each of the candidate actions 204-212 can be used by the planning component 112 to determine a future state of the autonomous vehicle 102 that may result from the vehicle performing the candidate action. In other examples, the planning component 112 may use similar or identical techniques to generate a number of candidate vehicle states (e.g., rather than candidate actions).

In this example, candidate actions 204-210 are indicated as heuristic-based (or policy-based) candidate actions, which may be predetermined by the planning component 112 based on a search exploration policy. Candidate action 204 may represent a "follow lane" trajectory, candidate action 206 may represent a "stop" trajectory, candidate action 208 may represent a "turn left" trajectory, and candidate action 210 may represent a "turn right" trajectory. In other examples, heuristics-based candidate actions such as candidate actions 204-210 may include fine instructions rather than general driving maneuvers, such as velocities or velocity changes, steering angles or steering angle changes, etc. As noted above, the heuristics-based candidate actions 204-210 may be predetermined by the planning component, in that they may be determined prior to the autonomous vehicle 102 arriving at the vehicle state 202. Because the heuristics-based candidate actions 204-210 need not depend on knowing the current vehicle state, the planning component 112 may determine these candidate actions in advance based on a desired exploration policy for the search space of possible trajectories for the autonomous vehicle 102. Further, similar or identical set of heuristics-based candidate actions 204-210 may be used for each node in a tree search.

In this example, candidate action 212 is an ML prediction-based candidate action that uses one or more ML models (and/or other predictive techniques) to predict the future trajectory of the autonomous vehicle 102, based on the vehicle state 202. As described above, the planning component 112 may determine the candidate action 212 by executing an adaptive learning-based ML model that is trained to output predicted future trajectory and/or predicted future vehicle state for the autonomous vehicle 102. In various examples, inputs to the adaptive learning-based ML model may include a representation of the driving environment associated with the vehicle state 202, perceived road and/or traffic signal data, agent data for various static objects and/or dynamic agents in the driving environment proximate to the autonomous vehicle 102, and/or encoded vehicle state data representing the vehicle state 202 and the intended destination of the autonomous vehicle 102.

In some cases, the planning component 112 may execute one or more trained active prediction models to determine the candidate action 212. As described below in more detail, an active prediction model may be trained to output, based at least in part on a current state of an autonomous vehicle 102 (including the current vehicle position, pose, and trajectory, etc.), predictions of future trajectories of the autonomous vehicle 102 and/or additional agents in the driving environment. In some examples, an active prediction model may be trained to determine a predicted future state of the environment as a whole, including predicted trajectories for the autonomous vehicle 102 and all other agents (and/or other objects or features) in the environment. For any objects in the environment (including the autonomous vehicle 102 and any number of additional autonomous agents and/or non-agent dynamic objects), an active prediction model may use the current states and trajectories of the objects, along with the features of the driving environment determined from map data (e.g., road positions and curves, lane permissibility, speed limits, traffic signals, crosswalks, etc.), to determine predicted future states for the objects. Additionally, the active prediction model may use deep learning and/or other ML-based techniques to predict various interactions between the objects in the environment, such as potential collisions, near-miss collisions, yielding behaviors, merging, etc. In response to predicting a potential interaction between the vehicle and an agent or other object (or between an agent and another agent/object), the active prediction model may proactively predict how each object may react to the potential interaction (e.g., by yielding, steering, braking, swerving, accelerating, etc.) and may determine the predicted trajectory the object accordingly.

An active prediction model may be used to determine the candidate action 212, as a predicted next action (e.g., trajectory) of the autonomous vehicle 102, based on the vehicle state 202 and the current state of the driving environment (including agent states). In some examples, the active prediction model may be an imitation model trained to output the most likely driving behavior for the autonomous vehicle 102 at the current state, based on various training that may include log data from human-controlled vehicles, log data from autonomously driven vehicles, and/or vehicle simulation data. Additionally or alternatively, the planning component 112 may determine the candidate action 212 using a reinforced learning model trained to output a trajectory (e.g., that candidate action 212) for the autonomous vehicle 102 provides an optimal value or reward with respect to any combination of metrics of the predicted vehicle state and environment.

In contrast to the heuristics-based candidate actions 204-210, in this example, the ML prediction-based candidate action 212 may depend on the vehicle state 202 and/or the associated state of the driving environment (e.g., including static objects and dynamic agent state data, etc.). As a result, in this example, the ML prediction-based candidate action 212 is not predetermined by the planning component 112, but may be determined on-the-fly with the tree search. In some cases, an active prediction model used to determine the candidate action 212 also may be used by additional components of the autonomous vehicle 102 (e.g., a prediction component) to predict the likely movements/trajectories of other agents in the environment. In such cases, determining the candidate action 212 by the planning component 112 may be performed quickly and may require few (if any) additional computational resources from the autonomous vehicle 102.

As noted above, although this example depicts a set of candidate actions 204-212 that includes four separate heuristics-based candidate actions 204-210 and one ML prediction-based candidate action 212, in other examples, the planning component 112 may determine any number of heuristics-based candidate actions and any number of ML prediction-based candidate actions.

Figure 2B:
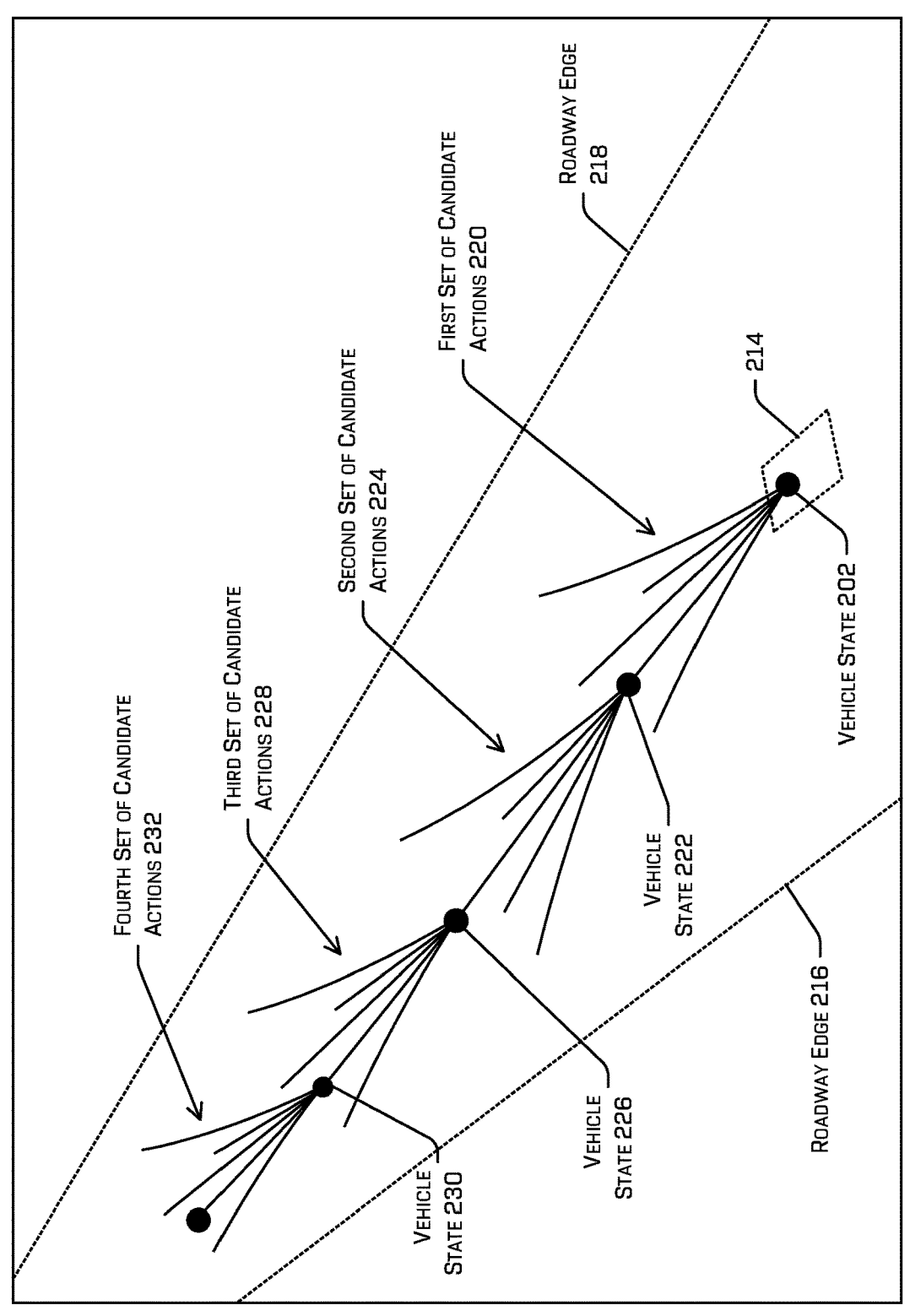
FIG. 2B illustrates an example representation of multiple sets of candidate actions associated with different nodes in a tree search to determine a trajectory, in accordance with one or more examples of the disclosure.

FIG. 2B illustrates a representation 200 of four different sets of candidate actions (e.g., trajectories in the depicted example) generated at four different nodes representing vehicle states at four different action layers of a tree search. Each vehicle state and each set of candidate actions in this example may be similar or identical, respectively, to the vehicle state 202 and the set of candidate actions 204-212 described above. In this example, FIG. 2B depicts the vehicle state 202, which may be a starting state in a driving root, corresponding to a root node in a tree search. The space occupied by the autonomous vehicle 102 at the vehicle state 202 is represented as a dashed line 214. FIG. 2B also represents two roadway edges, roadway edge 216 and roadway edge 218.

The first set of candidate actions 220 may be determined by the planning component 112 based at least in part on the vehicle state 202, including the vehicle position, pose, velocity, acceleration, steering rate, etc., of the autonomous vehicle 102, as well as the environment state data associated with the root node. As in the previous example, the length of a candidate action may indicate a velocity and/or acceleration associated with the candidate action.

The second set of candidate actions 224 may be generated based at least in part on selecting a first candidate action of the first set of candidate actions 220 for exploration, and based at least in part on the vehicle state 222 (e.g., position, pose, velocity, steering rate, etc.), that the selected first candidate action would cause the vehicle to perform upon concluding execution of the first candidate action within the current state of the environment. In some cases, the vehicle state 222 may represent a subsequent vehicle state based on performing one of the heuristic-based candidate actions, while in other cases the vehicle state 222 may represent a subsequent vehicle state based on performing an ML prediction-based candidate action. When evaluating the first set of candidate actions 220 and/or when selecting the vehicle state 222 for further exploration in the tree search, the planning component 112 may generate a search tree node representing the selected vehicle state 222.

The third set of candidate actions 228 may similarly be based at least in part on selection of a second candidate action from among the second set of candidate actions 224, based at least in part on the vehicle state 226 that the selected second candidate action would cause the vehicle to perform upon concluding execution of the second candidate action within the subsequent state of the environment associated with vehicle state 226 (e.g., the future predicted environment state, vehicle state, agent positions, etc., at the time of vehicle state 226). When evaluating the second set of candidate actions 224 and/or when selecting the vehicle state 226 for further exploration in the tree search, the planning component 112 may generate a search tree node representing the selected vehicle state 226. Similarly, the fourth set of candidate actions 323 may be based at least in part on selection of a third candidate action from among the third set of candidate actions 228, based at least in part on the vehicle state 230 that the selected third candidate action would cause the vehicle to perform upon concluding execution of the third candidate action within the state of the environment associated with vehicle state 230. When evaluating the third set of candidate actions 228 and/or when selecting the vehicle state 230 for further exploration in the tree search, the planning component 112 may generate a search tree node representing the selected vehicle state 230, and so on.

In some examples, the representation 200 may be a visual depiction of a determinized sparse partially observable tree (DESPOT) determined according to a partially observable Markov decision process (POMDP).

Figure 3:
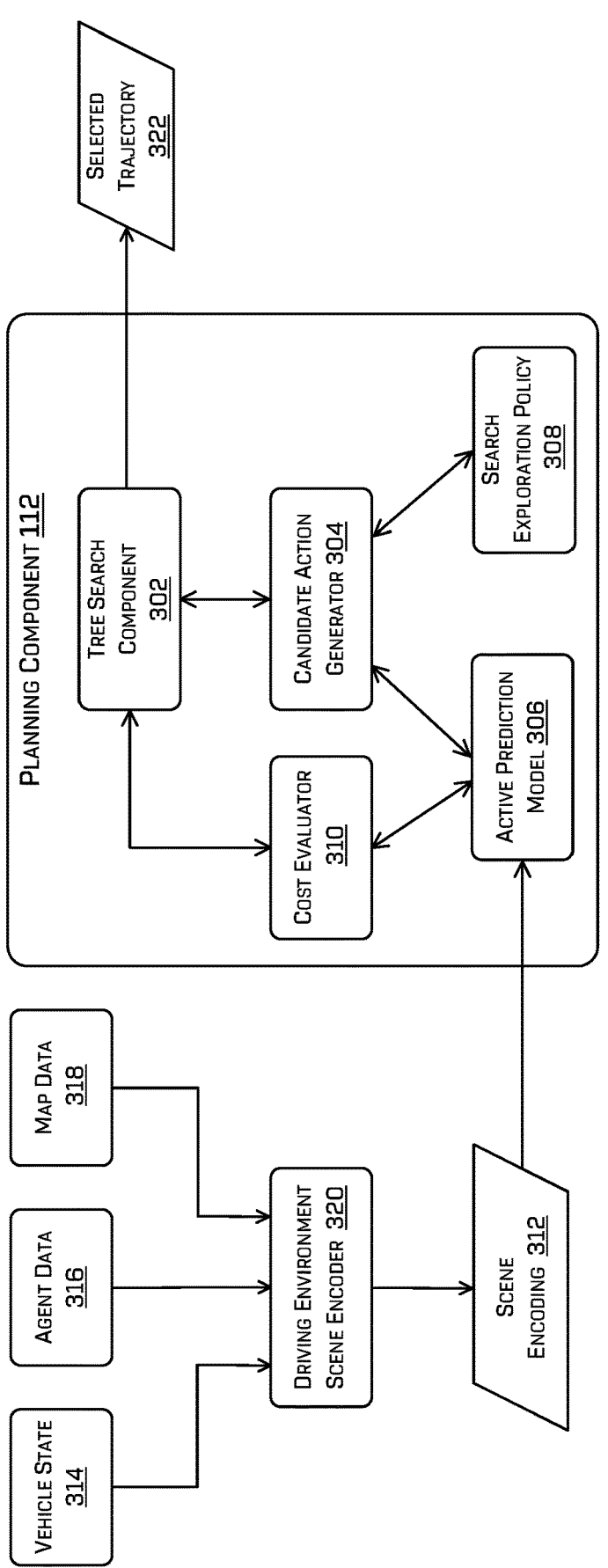
FIG. 3 is a block diagram illustrating an example system for using a planning component to determine a trajectory for a vehicle, in accordance with one or more examples of the disclosure.

FIG. 3 depicts an example system 300 including a planning component 112 of an autonomous vehicle configured to determine a trajectory for the vehicle using a tree search (and/or other search algorithms) including a combination of heuristics-based candidate actions and ML prediction-based candidate actions, and cost evaluations based on the predicted future states of the vehicle and the environment. As discussed below, at least some of the components of system 300 may be implemented within a planning component 112, such as a tree search component 302, a candidate action generator 304, an active prediction model 306, a search exploration policy component 308, and/or a cost evaluator 310. However, as described below, one or more of these components may be implemented within separate components within the computing device(s) 104 (e.g., within a prediction component) and/or within separate computing devices/systems (e.g., within a GPU-based computing system).

The system 300 may be implemented to perform on-board trajectory determination for an autonomous vehicle 102 in real-time driving environments. In some examples, the tree search component 302 may be configured to generate and traverse a search tree (or other data structure) to determine a potential vehicle trajectory as described herein. Additional examples of techniques for generating and traversing search trees to determine trajectories for controlling the motion of autonomous vehicles, based on determining a candidate action and predicting a future state based on the candidate action can be found, for example, in U.S. patent application Ser. No. 17/394,334, filed on Aug. 4, 2021, and titled, "Vehicle Trajectory Control Using A Tree Search," which is incorporated by reference herein in its entirety for all purposes. Based on the tree search techniques described herein, the tree search component 302 may determine one or more paths through the nodes of the tree structure representing the driving route. In some cases, the tree search component 302 may evaluate multiple different paths through the tree to identify one or more low-cost paths representing possible trajectories for the vehicle to follow.

The candidate action generator 304 may determine sets of candidate actions to be used, evaluated, and/or selected by the tree search component 302 during the tree search. As described above, at each node in the search tree (or other data structure) the tree search component 302 may evaluate a set of multiple candidate actions and select one (or more) of the lowest-cost candidate action(s) for further exploration during the tree search. The candidate actions determined by the candidate action generator 304 for the tree search may include a combination of ML prediction-based candidate actions representing predictions of the trajectory and/or future state of the vehicle, and/or heuristic-based candidate actions that are predetermined based on a policy to sufficiently explore the search space of potential trajectories.

In this example, the candidate action generator 304 may use a search exploration policy component 308 to determine one or more heuristic-based candidate actions. As described above, the heuristics-based candidate actions may represent general driving maneuvers and/or fine instructions including sets of vehicle control parameters such as velocities or velocity changes, steering angles or steering angle changes, etc. In some cases, the heuristics-based candidate actions stored and/or determined by the search exploration policy component 308 may be determined and need not take into account the current state of the driving environment, including the current vehicle state, the state of the vehicle relative to the map data (e.g., current lane position, trajectory of the lane/roadway, current speed limit, etc.), and/or need not take into account the static and/or dynamic objects perceived by the vehicle's sensors. For instance, the search exploration policy component 308 may include a static list or table of predetermined heuristic-based candidate actions, in which the same list/table may be applied for multiple nodes and/or multiple tree searches performed by the tree search component 302. For instance, the search exploration policy component 308 may include sets of relative vehicle trajectory parameters (e.g., a relative velocity and a relative steering angle with respect to a current vehicle state) defining predetermined candidate actions representing a "follow lane" candidate action, a "turn left" candidate action, a "turn right" candidate action, and a "stop" candidate action, etc.

Additionally, in this example, the candidate action generator 304 may use an active prediction model 306 to determine one or more ML prediction-based candidate actions. An ML prediction-based candidate action may include an action and/or trajectory determined using adaptive learning, machine learned models, and/or other prediction-based techniques, representing a prediction of the trajectory or state of the autonomous vehicle 102 at a future time step, based on the current state of the autonomous vehicle 102 and/or current environment state data.

To generate the ML prediction-based candidate actions, the active prediction model 306 may include one or more ML models trained to output, based at least in part on a current (or initial) vehicle state/trajectory, predictions of one or more future trajectories/states of the autonomous vehicle 102 and/or additional agents in the driving environment. In some examples, the active prediction model 306 may be trained to determine a predicted future state of the environment as a whole, including predicted trajectories for the autonomous vehicle and all other agents (and/or other objects or features) in the environments. For instance, for any objects in the environment (including the autonomous vehicle 102 and any number of additional autonomous agents and/or non-agent dynamic objects), the active prediction model 306 may use the current states and trajectories of the objects, along with the features of the driving environment determined from map data (e.g., road positions and curves, lane permissibility, speed limits, traffic signals, crosswalks, etc.), to determine predicted future states for the objects. Additionally, the active prediction model 306 may use deep learning and/or other ML-based techniques to predict various interactions between the objects in the environment, such as potential collisions, near-miss collisions, yielding behaviors, merging, etc. In response to predicting a potential interaction between the vehicle and an agent/object (or between an agent and additional agents/objects), the active prediction model 306 may proactively predict how each object may react to the potential interaction (e.g., by yielding, steering, braking, swerving, accelerating, etc.) and may determine the predicted trajectory the object accordingly.

As noted above, in various examples, the active prediction model 306 may include imitation models and/or reinforced learning models used to predict the future state of the environment as a whole and/or to predict the future trajectories/states of the autonomous vehicle 102 based on the input data. Based on an input driving environment (e.g., a scene encoding 312) and input vehicle state and/or trajectory for the autonomous vehicle 102, the active prediction model 306 may output a set of predicted future trajectories/states for the autonomous vehicle 102, and/or predicted future driving scenes. The output may include predicted trajectory points and/or a driving scene encoding for any number of discreet time steps over the time period corresponding to the vehicle trajectory. In some cases, the output of the active prediction model 306 may include trajectories and/or driving scene encoding for a single most likely predicted future of the driving environment. In other examples, the active prediction model 306 may output any number of alternative trajectories for the autonomous vehicle 102, the various agents, and/or the driving environment as a whole. For instance, in complex multi-agent environments, the behaviors of independent and autonomous agents (and/or other objects) cannot be predicted with certainty, and agents may react to the different possible trajectories/paths taken by the autonomous vehicle 102 in unpredictable ways. As a result, the active prediction model 306 may output multiple alternative predicted trajectories and/or driving scene encodings in some cases. The alternative future predictions may include confidences and/or rankings determined by the active prediction model 306, based on the likelihood of the particular set of trajectories/future driving scenes.

In some examples, the active prediction model 306 may be implemented based at least in part on the various techniques and systems described in U.S. patent application Ser. No. 17/351,641, filed Jun. 18, 2021, and entitled, "Active Prediction Based On Object Trajectories," the entire contents of which are incorporated herein by reference in their entirety for all purposes.

The active prediction model 306 may receive as inputs an initial vehicle trajectory of the autonomous vehicle 102, as well as a representation of the driving environment in which the vehicle is operating. In this example, a driving environment scene encoder 320 may generate a scene encoding 312 representing the current environment, based at least in part on current vehicle state data 314 (which may include an intended destination and/or driving preferences of the autonomous vehicle 102), agent data 316 based on the perception component 110 and/or data captured by the vehicle sensors of static and/or dynamic agents in the environment, and map data 318 from a map component of the vehicle. For instance, using the perception component 110 based on data captured by the vehicle sensors 106, the driving environment scene encoder 320 may generate a scene encoding 312 (e.g., a scene embedding) which may be a vector unique to the particular driving scene and scenario, representing the driving environment at a particular time. In some cases, the driving environment scene encoder 320 may use a neural network architecture that is trained to output scene encodings based on inputs a combination of map data and data perceived by the vehicle in the environment. For instance, the driving environment scene encoder 320 may receive input data including a representation of the driving environment at a specific time (e.g., map data and/or a road network), perceived road and traffic signal data at the specific time (e.g., traffic light states, road permissibility, etc.), proximate agent data for static and/or dynamic agents in the environment at the specific time, and encoded vehicle state data including the intended destination of the vehicle at the specific time. In some examples, the driving environment scene encoder 320 may receive as an input the previous states of the autonomous vehicle (e.g., a sequence of connected nodes in the tree structure representing a portion of a candidate trajectory), and/or the active prediction model 306 may the previous states of the autonomous vehicle as additional inputs, upon which the prediction model 306 may use to predict the subsequent autonomous vehicle trajectory and/or the subsequent states of the driving environment. A neural network within the driving environment scene encoder 320 may transform the input data into the scene encoding 312, which may be represented as a multidimensional vector within a driving scene embedding space. Additional examples of various techniques for determining scene encodings and/or other representations of an environment can be found, for example, in U.S. patent application Ser. No. 17,855,088, filed Jun. 30, 2022, and entitled, "Machine-Learned Component For Vehicle Trajectory Generation," the entire contents of which are incorporated herein by reference in their entirety for all purposes.

As shown in this example, the active prediction model 306 may determine predicted future trajectories (and/or other predicted vehicle state data) for the autonomous vehicle and any other agents/objects in the environment, and/or predicted future states for the environment as a whole. In some examples, the active prediction model 306 may output a predicted future scene encoding, having a similar or identical encoding format as that of the current scene encoding 312. As noted above, the active prediction model 306 also can be applied recurrently to determine sequences of predicted vehicle and agent trajectories, and/or scene encodings.

The cost evaluator 310 may receive the determined costs associated with the various candidate actions determined by the candidate action generator 304. In some instances, the cost evaluator 310 may use the active prediction model 306 and/or other ML-based prediction models to predict future trajectories/states for the autonomous vehicle 102 based on a candidate action, and/or predicted future environment states based on the candidate action. The cost evaluator 310 then may evaluate the predicted trajectories and/or environments to determine sets of associated costs. Costs may be determined by evaluating individual the predicted trajectories/states for the autonomous vehicle 102 based on the candidate action, and/or the predicted trajectories/states for other agents in the environment.

For instance, for evaluating an ML prediction-based candidate action generated using the active prediction model 306, the cost evaluator 310 may use the same predicted vehicle states/trajectories and same predicted driving environment states that were used to determine the candidate action, to evaluate the costs associated with the candidate action. In other examples, for evaluating heuristics-based candidate action generated based on the search exploration policy component 308, the cost evaluator 310 may provide the heuristics-based candidate action to the active prediction model 306 (or other prediction model) to evaluate the costs associated with the heuristics-based candidate action. In some examples, to execute more quickly and save computational resources, the cost evaluator 310 need not re-execute the active prediction model 306 in full for each of the heuristics-based candidate actions. For instance, to evaluate the cost of a heuristics-based candidate action, the cost evaluator 310 may implement an assumption that the autonomous vehicle 102 may continue performing the same candidate action throughout the driving route (e.g., until an end state or end time step is reached).

In addition to or as an alternative to using the active prediction model 306 for computing costs associated with a candidate action, the cost evaluator 310 also may include various heuristics and/or ML-based components configured to detect and compute costs associated with potentially unsafe, illegal, or risky driving maneuvers. Such costs, which may be referred to as safety costs, may include speeding, driving out of a lane or crossing a double-yellow line, stopping in a crosswalk, braking, accelerating, or steering too sharply based on the road/lane configuration and the current driving conditions, etc. Additional costs determined by the cost evaluator 310 may include passenger comfort costs (e.g., based on sharp turns, unnecessary turns, bumps, jerkiness, or inconsistency of the trajectory, etc.), and route progress costs (e.g., based on longitudinal distance obtained, vehicle velocity, and/or time-to-go costs between the current vehicle position and the route end state). For these costs and the various other costs described herein, the cost evaluator 310 may be configured to evaluate the trajectories output by the active prediction model 306, including the predicted trajectory of the autonomous vehicle 102 and/or of the additional agents in the environment, and to compute cost values associated with the predicted trajectories, individually or in combination.

In addition to costs based on evaluating individual trajectories, the cost evaluator 310 also may determine costs by analyzing multiple predicted trajectories together (and/or the predicted environment as a whole) to identify potential interactions between the autonomous vehicle 102 and one or more additional agents or other objects in the environment. For instance, the cost evaluator 310 may compute cost values based on determining potential intersecting points between the trajectories of the autonomous vehicle 102 (e.g., assuming the autonomous vehicle 102 continues to perform the candidate action) and an agent (or multiple agents) at any future time in the predicted driving scene. Such interaction costs may include costs based on detecting a potential collision or near-miss collision, a failure to yield and/or an aggressive driving cost of the autonomous vehicle 102 relative to other vehicles, pedestrians, bicycles, etc. In some examples, the cost evaluator 310 may determine interaction costs based on potential intersecting points between multiple agents that might not include the autonomous vehicle 102.

In various examples, the cost evaluator 310 may evaluate candidate actions individually (e.g., based on costs associated with individual trajectories and/or groups of potentially interacting trajectories) and/or the driving scene/environment as a whole, at multiple predicted future time steps. As noted above, the cost evaluator 310 may use the active prediction model 306 to determine predicted trajectories and/or predicted driving scene encodings over a time period (e.g., 2 seconds, 5 seconds, 10 seconds, etc.) that may include any number of discreet time steps. The cost evaluator 310 may evaluate the trajectories/driving scene and determine costs associated with individual discreet time steps, and may aggregate the various costs (e.g., including both individual trajectory costs and vehicle-agent interaction costs) over the discreet time steps for the entirety of the trajectory of the autonomous vehicle 102. In some examples, the cost evaluator 310 may up-weight the costs determined based on earlier time steps in the trajectory, which may be more likely to occur, and down-weight the costs based on later time steps in the trajectory, which may be less likely to occur.

Additionally, when the active prediction model 306 outputs multiple alternative predicted trajectories and/or driving scene encodings based on a candidate action, the cost evaluator 310 may compute costs associated with each alternative future prediction. For instance, the cost evaluator 310 may compute a first set of costs associated with a first set of trajectories output by the active prediction model 306, and may separately compute a first set of costs associated with a first set of trajectories output by the active prediction model 306, associated with the same candidate action. To determine an overall cost associated with the candidate action, the cost evaluator 310 may aggregate and/or weight costs from the alternative predicted sets of trajectories/states, using the respective confidence values and/or likelihoods of the sets of trajectories to scale/weight the overall cost computation.

After computing a cost value or set of cost values associated with a particular candidate action, the cost evaluator 310 may provide the cost(s) back to the tree search component 302, which may select one or more of the candidate actions from a node in the tree for further exploration. As described above, the tree search component 302 may perform these techniques iteratively, including determining a new node representing a vehicle state, determining candidate actions for the vehicle state, evaluating the candidate actions using cost functions via the cost evaluator 310, and generating the tree by creating one or more additional nodes based on the selected candidate actions. Upon reaching the intended end state for the driving route, the tree search component 302 may determine one or more paths of nodes through the tree structure representing one or more possible trajectories for the autonomous vehicle 102 to follow through the driving environment. The tree search component 302 may determine a lowest-cost and/or optimal path, or multiple paths, based on the degree to which the search space of possible trajectories was explored using the determined candidate actions and/or based on the cost metrics/thresholds used by the tree search component 302 to determine optimal or lowest-cost trajectories. When the tree search component 302 has determined a possible solution trajectory (e.g., an optimal or lowest-cost trajectory through the tree structure) based on the node costs, the trajectory may be selected as a selected trajectory 322 (or control trajectory) for the autonomous vehicle 102 to follow.

In some examples, the candidate action generator 304 may determine a consistent number of heuristics-based candidate actions and a consistent number of ML prediction-based candidate actions, for each node in a tree search and/or for each tree search performed by the planning component 112. However, in other examples, the tree search component 302 and/or the candidate action generator 304 may determine different numbers of candidate actions to be evaluated for different tree searches and/or for different nodes within the same tree search. The different numbers of candidate actions may include varying the number of heuristics-based candidate actions that are evaluated, varying the number of ML prediction-based candidate actions that are determined and evaluated, or varying both. In some examples, while generating the tree structure, the candidate action generator 304 may determine a predetermined number of heuristics-based candidate actions for the root node in the tree structure, and may reduce the number of heuristics-based candidate actions used for subsequent nodes as the tree generation and search progresses further from the root node toward the leaf nodes representing the end state of the driving route. Similarly, the candidate action generator 304 may determine a larger number of ML prediction-based candidate actions at the root node (e.g., based on multiple possible predicted environment states, and/or using different ML prediction models, such as imitation models and/or reinforced learning models, etc.), and may reduce the number ML prediction-based candidate actions for subsequent nodes at higher node levels in the tree search. In some examples, the candidate action generator 304 also may vary the number of heuristics-based candidate actions and/or ML prediction-based candidates based on the type of driving scene (e.g., highway driving, crosswalk scene, 4-way intersection, parking lot, etc.), the complexity of the driving scene (e.g., the presence of lane-blocking static objects, the number of additional agents, etc.), and/or the driving conditions (e.g., weather conditions, traffic conditions, etc.).

Additionally or alternatively, the candidate action generator 304 may determine the numbers of heuristics-based candidate actions (and/or which specific heuristics-based candidate actions) to evaluate for a particular node and/or a particular tree search, based on the confidence level of the ML prediction-based candidate action(s). For instance, if the active prediction model 306 determines, as a candidate action, a predicted trajectory for the autonomous vehicle 102 having a high degree of confidence, then the candidate action generator 304 may evaluate fewer heuristics-based candidate actions. In contrast, when the active prediction model 306 determines a lower level of confidence for one or more ML prediction-based candidate actions, then the candidate action generator 304 may evaluate a larger number of heuristics-based candidate actions to more fully explore the search space of possible trajectories. In some cases, a probability for the ML prediction-based candidate action may be determined for an individual leaf node and/or other higher-level nodes in the tree search, and the candidate action generator 304 may determine the number of heuristics-based candidate actions to evaluate for the individual nodes based on the associated probabilities.

In some examples, the tree search component 302 and/or the candidate action generator 304 may evaluate the performance of heuristic-based candidate actions during a tree search and/or over multiple tree searches, to determine the numbers of heuristic-based candidate actions and which particular heuristic-based candidate actions to evaluate for future tree searches. For instance, the candidate action generator 304 may compute metrics such as how often the heuristic-based candidate actions are selected for further exploration in the tree search, how often these candidate actions produce lower cost trajectories than the ML prediction-based candidate actions, etc. The candidate action generator 304 may determine such metrics for the set of heuristic-based candidate actions as a whole, and/or for individual heuristic-based candidate actions (e.g., "follow lane," "turn right," "turn left," "brake," etc.). Based on these metrics, the tree search component 302 and/or candidate action generator 304 may determine the number of heuristic-based candidate actions, and which specific heuristic-based candidate actions, to be evaluated for particular nodes and/or particular tree searches.

Figure 4B:
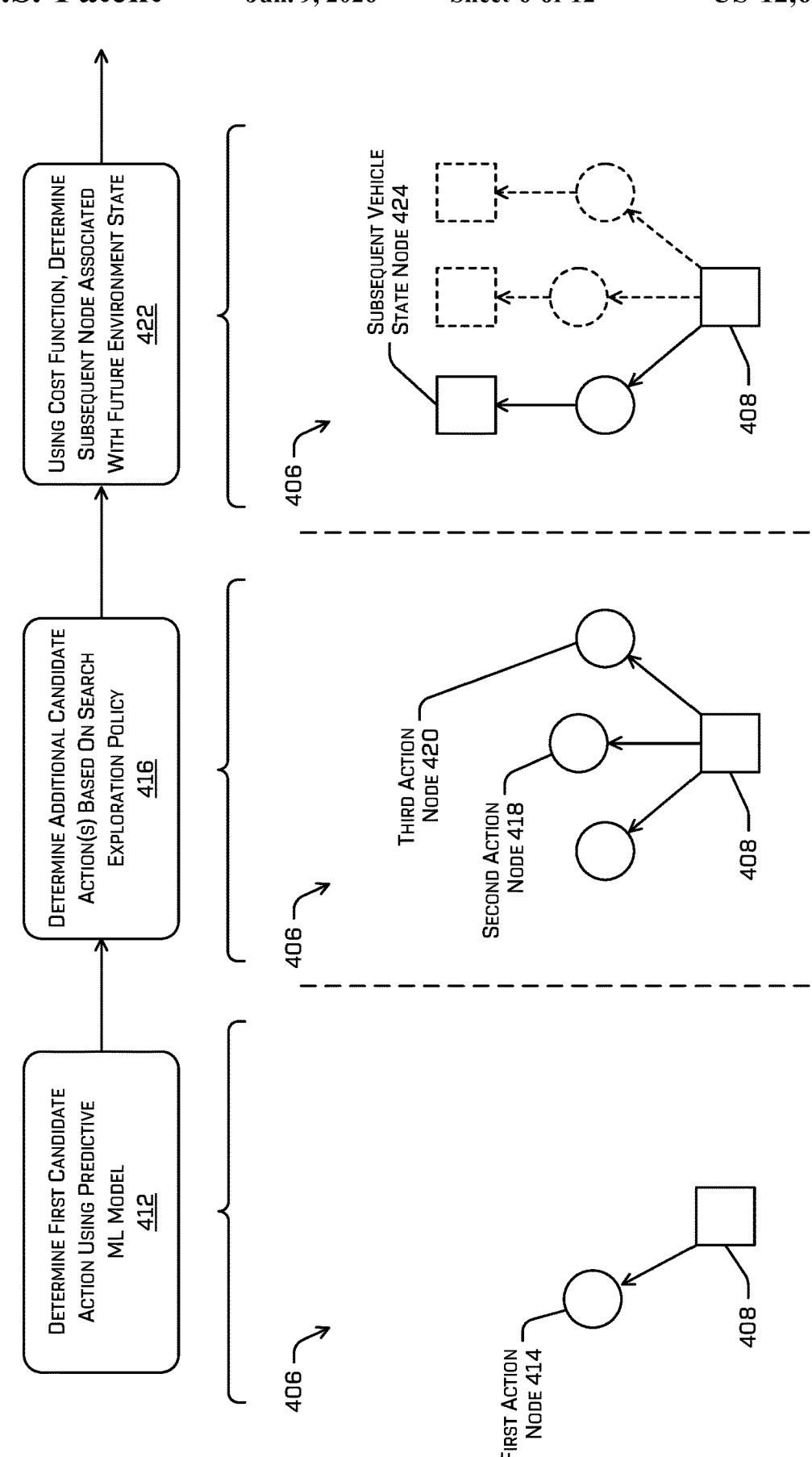
Figure 4C:
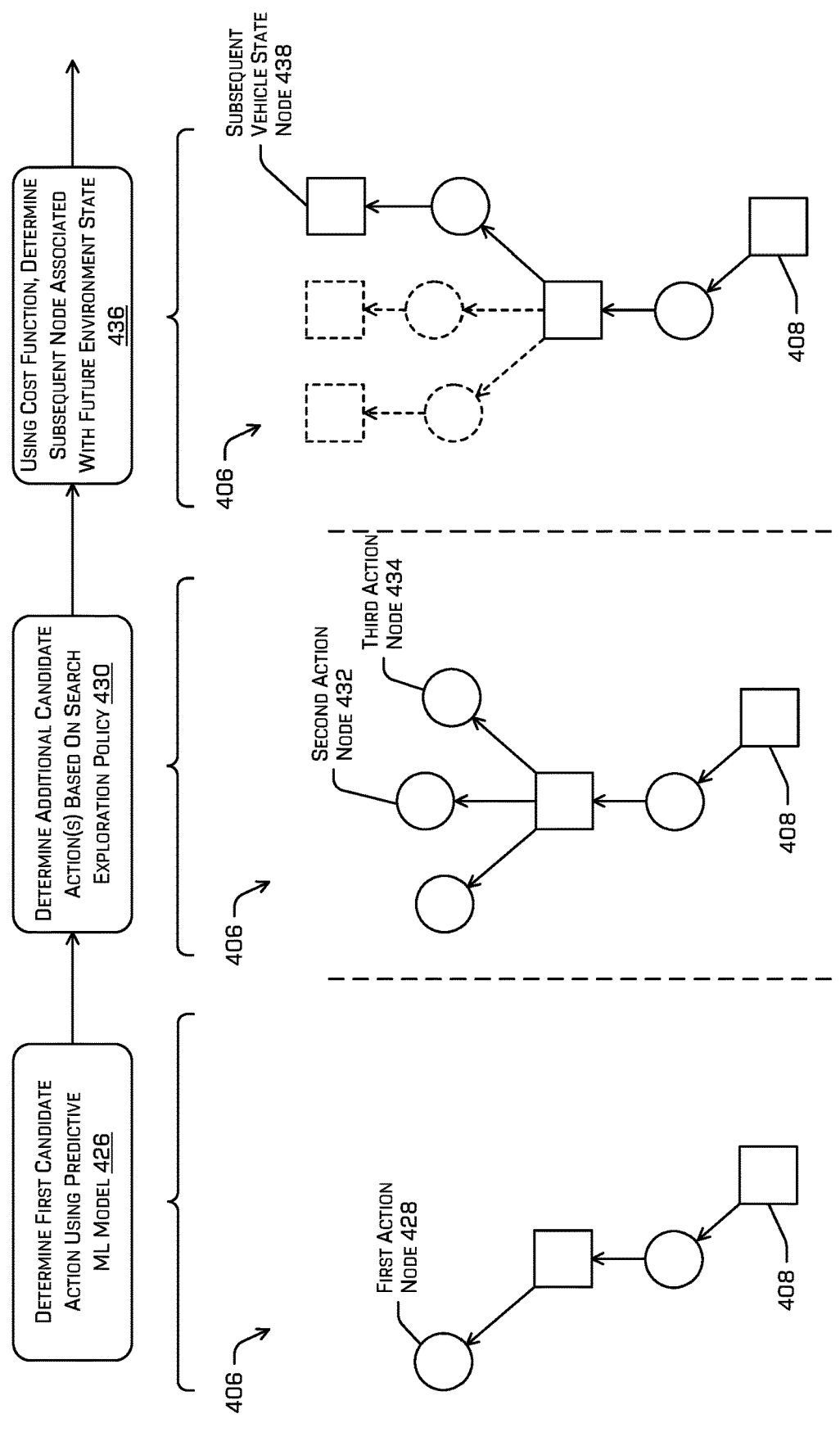

FIGS. 4A-4C illustrate a pictorial flow diagram of an example process 400 for generating a trajectory for controlling a vehicle (e.g., autonomous vehicle 102) using a tree search that includes iteratively determining candidate actions and evaluating corresponding vehicle/environment states to traverse the tree. Example process 400 may be executed by a planning component 112 of the autonomous vehicle 102 although, in at least some instances, example process 400 may be additionally or alternatively executed by a simulation component, perception component, and/or prediction component of the autonomous vehicle 102. In some examples, the tree search conducted by the guidance component may include executing a Monte-Carlo tree search (MCTS); partially observable Monte-Carlo planning (POMCP); Markov decision process (MDP), such as a partially observable MDP (POMDP); or the like improved with the techniques discussed herein, including agent filtering, upper/lower bound cost estimations, and/or defaulting to a default policy.

At operation 402, example process 400 may comprise receiving driving route data and sensor data associated with at least a start position in an environment. FIG. 4A depicts an environment 404 in which an autonomous vehicle 102 is located that may be executing example process 400. The start position may be associated with a current position/state of the autonomous vehicle 102, and the route may specify an end position/state, and may, in some examples, include intervening targets or operations, such as exiting a freeway, seeking to stay in a particular lane, targeting parking on a particular block (but not a particular position, although in some examples, a particular portion of the block may be identified), etc. The sensor data received in operation 402 may include any of the sensor data associated with one or more sensors, according to any of the techniques discussed herein. The sensor(s) may be associated with the autonomous vehicle 102 and/or other computing devices. Operation 402 also may include determining environment state data based at least in part on the sensor data. In some examples, a perception component 110 may determine the environment state data for any static and/or dynamic objects detected by the perception component. For instance, the environment state data received in operation 402 may include positions, poses, trajectories, and/or other characteristics of the autonomous vehicle 102 and/or any others in the environment (e.g., other vehicles, pedestrians, bicycles, buildings, traffic signals, road debris, etc.).

At operation 406, the planning component 112 may determine, based at least in part on the sensor data, a root node 408 for a tree search, according to any of the techniques discussed herein. In some examples, determining the root node may comprise determining a data structure 410 for the tree search, which may comprise setting up and storing a directed acyclic graph (DAG); upper confidence bounds applied to trees (UCT); determinized sparse partially observable tree (DESPOT); or the like for modeling control states and environment states. The root node 408 may be associated with a current time and/or the most recent sensor data or batch of sensor data. As such, the root node 408 may be associated with perception data that may or may not include prediction data, and/or may identify environment state data that includes a current position, orientation, velocity, acceleration, classification, etc. of static and/or dynamic objects (including similar information for the vehicle, which may be generated by the localization component of the vehicle) in the environment and may additionally or alternatively include historical data of the same.

At operation 412, shown in FIG. 4B, the planning component 112 may determine a first action node 414 based at least in part on the root node 408. In this example, the figures may depict state nodes (e.g., representing vehicle states and/or environment states, and which also may be referred to prediction nodes) as squares, and may depict candidate action nodes as circles. Dashed lines and/or may represent relationships between nodes that are as-of-yet undiscovered/ undetermined and/or may represent nodes that have been discarded and are not to be further explored during the tree search. Action nodes, such as the first action node 414, may represent candidate actions for controlling the motion of the autonomous vehicle 102 (e.g., based at least in part on a previous state node), according to any of the techniques discussed herein. In this example, the first action node 414 may represent an ML prediction-based candidate action determined using an active prediction model 306. Determining the first candidate action may include providing to the active prediction model 306 vehicle state data and/or environment state data associated with the root node 408, upon which the candidate action is based, and receiving an output from the active prediction model 306 representing a predicting future vehicle state and/or trajectory for the autonomous vehicle 102 based on the inputs to the active prediction model 306.

At operation 416, the planning component 112 may determine a second action node 418 and a third action node 420 representing additional possible candidate actions for controlling the motion of the autonomous vehicle 102 based on the root node, according to any of the techniques discussed herein. In this example, the second action node 418 and the third action node 420 may represent heuristic-based candidate actions determined based on a search exploration policy received or determined by the autonomous vehicle 102.

At operation 422, the planning component 112 may use one or more cost functions to select a candidate action (or multiple candidate actions) for further exploration in the tree search, and/or to determine a subsequent vehicle state node 424 based on the selected candidate action. The determination of the costs and/or the selection of candidate actions may be performed using cost evaluator 310, according to any of the techniques discussed herein. For example, separate costs may be computed for each of the candidate actions (e.g., represented by the first action node 414, second action node 418, and third action node 420), based at least in part on a variety of sub-costs including proximity cost(s), safety cost(s), comfort cost(s), and/or progress cost(s). These sub-costs may be based at least in part on the environment state data indicated by the last vehicle state node (whether the last vehicle state node is the root node 408 or another vehicle state node). As an example, proximity cost(s) may be based at least in part on a minimum, average, or other distance that a candidate action takes the autonomous vehicle 102 from a static and/or dynamic object. The safety cost(s) may include a score indicating conformance to rules of the road, proximity to other object(s) and/or a velocity associated with the candidate action (e.g., the safety cost may penalize candidate actions that are close to (e.g., within a threshold distance of) an object and moving at a high speed and not penalize or only provide a small penalty to candidate actions that are close to an object but associated with a low speed-high-speed candidate actions that are far from other objects may be unpenalized by this cost), and/or proximity to a non-drivable surface (e.g., sidewalk, building, closed lane). In an example where the safety cost(s) include a variable cost based on velocity and lateral distance to an object, the cost may be determined based at least in part a hinge function, such as an L1 or L2 hinge function. In some examples, the hinge point in the hinge function where a penalty starts being applied may be based on distance to the object, velocity associated with the candidate action, object track, and/or object type. For example, a penalty may start applying further away from a biker than from a vehicle and/or a penalty may be higher/more severe for bikers than for vehicles. Moreover, the penalty may be more severe the faster the velocity associated with the candidate action once the candidate action is within the threshold distance of the vehicle (e.g., the hinge point of the hinge function). In at least one example, the threshold distance for applying the penalty specified by the L1 or L2 hinge function may be based at least in part on the velocity associated with the candidate action. In other words, fast candidate actions will have a penalty applied further from the object than slow candidate actions and the L1 or L2 penalty may become more severe (e.g., steeper slope in the case of L1, larger coefficient and/or squared value) the closer a fast candidate action comes to the object compared to the same distance from a slow candidate action to the object.

In some examples, comfort cost(s) may be based at least in part on a velocity, jerk, and/or acceleration associated with the candidate action and/or whether the candidate action would violate a threshold jerk and/or acceleration. The progress cost(s) may be based at least in part on completion of a mission or sub-goal (e.g., parking at a portion on a block, parking within a block, changing lanes) and/or displacement of the autonomous vehicle 102 along a driving route. For example, the progress cost(s) may reward the further the autonomous vehicle 102 would be along the route if the candidate action were executed. A cost that is calculated as a reward may have an opposite sign as the other sub-costs. For example, if there is a positive cost for a candidate action that would violate a comfort metric (e.g., the candidate action would exceed a threshold jerk), a reward may be a negative sub-cost. More details regarding how to determine the costs are discussed in U.S. patent application Ser. No. 16/872,284, filed May 11, 2020, the entirety of which is incorporated by reference herein.

In at least one example, the cost associated with a particular action node may include a cost of arrival (e.g., a sum of the costs of all the action node(s) leading up to that action node for any action node deeper than the first layer), a cost to execute the action (e.g., which may include the cost(s) discussed above, such as the comfort cost(s), progress cost(s), etc.), and a cost to progress further after that action node, which may also be characterizes as the cost to transition to a different state in the future. Modeling this future cost, also called the cost-to-go, may be complex and require a large amount of computational power when the number of action nodes being explored in the tree search is considered. In reinforcement learning, the cost-to-go is also called the "value" of being at the particular state.

In some examples, the first action node 414, second action node 418, and third action node 420 each may be associated with controlling the vehicle over a first time period. As discussed below, candidate actions of a layer deeper than the layer associated with the first action node 414 (e.g., which includes action nodes 418 and 420) may be associated with controlling the vehicle over a second time period. In some examples, the time periods associated with each subsequent layer of action nodes may be equal or, in an additional or alternate example, the time periods may increase in length (e.g., exponentially, logarithmically). For example, the first set of candidate actions (including the first action node 414) may be associated with controlling the vehicle over a 1 second period, the second set of candidate actions (e.g., including action nodes 428, 432, and 434) one layer deeper than the first layer may control the vehicle over 1.1 seconds, a third layer may control the vehicle over a period of 1.25 seconds, and so on. This increasing time period may ensure that a greater precision and/or accuracy is obtained for imminent actions, while also ensuring that the more distant actions won't control the vehicle in a manner that results in higher costs/negative outcomes.

At operation 426, shown in FIG. 4C, the planning component 112 may determine another first action node 428 based at least in part on the previously selected vehicle state node 424. As in the previous node layer of action nodes, the first action node 428 may represent candidate actions for controlling the motion of the autonomous vehicle 102 based at least in part on the vehicle state node 424, according to any of the techniques discussed herein. In this example, the first action node 428 may represent an ML prediction-based candidate action determined using an active prediction model 306, based on the vehicle state data and/or environment state data associated with the vehicle state node 424, and receiving an output from the active prediction model 306 representing a predicting future vehicle state and/or trajectory for the autonomous vehicle 102 for a time period representing a second set of candidate actions.

At operation 430, the planning component 112 may determine an additional second action node 432 and a third action node 434 representing additional possible candidate actions for controlling the motion of the autonomous vehicle 102 based on the subsequent vehicle state node 424, according to any of the techniques discussed herein. In this example, the second action node 432 and the third action node 434 may represent heuristic-based candidate actions determined based on a search exploration policy received or determined by the autonomous vehicle 102.

At operation 436, the planning component 112 may use one or more cost functions to select a candidate action for further exploration in the tree search, and/or to determine an additional subsequent vehicle state node 438 based on the selected candidate action (e.g., the third action node 434). As in the previous examples, the determination of the costs and/or the selection of candidate actions may be performed using cost evaluator 310, according to any of the techniques discussed herein, based on a variety of sub-costs including proximity costs, safety costs, comfort costs, and/or progress costs, etc. Although only two layers of candidate actions (and representative action nodes) and selected vehicle state nodes are shown in this example, it can be understood that the planning component 112 may perform similar or identical functions iteratively for any number of candidate action node layers, until an intended end state for the autonomous vehicle 102 is reached.

Figure 5A:
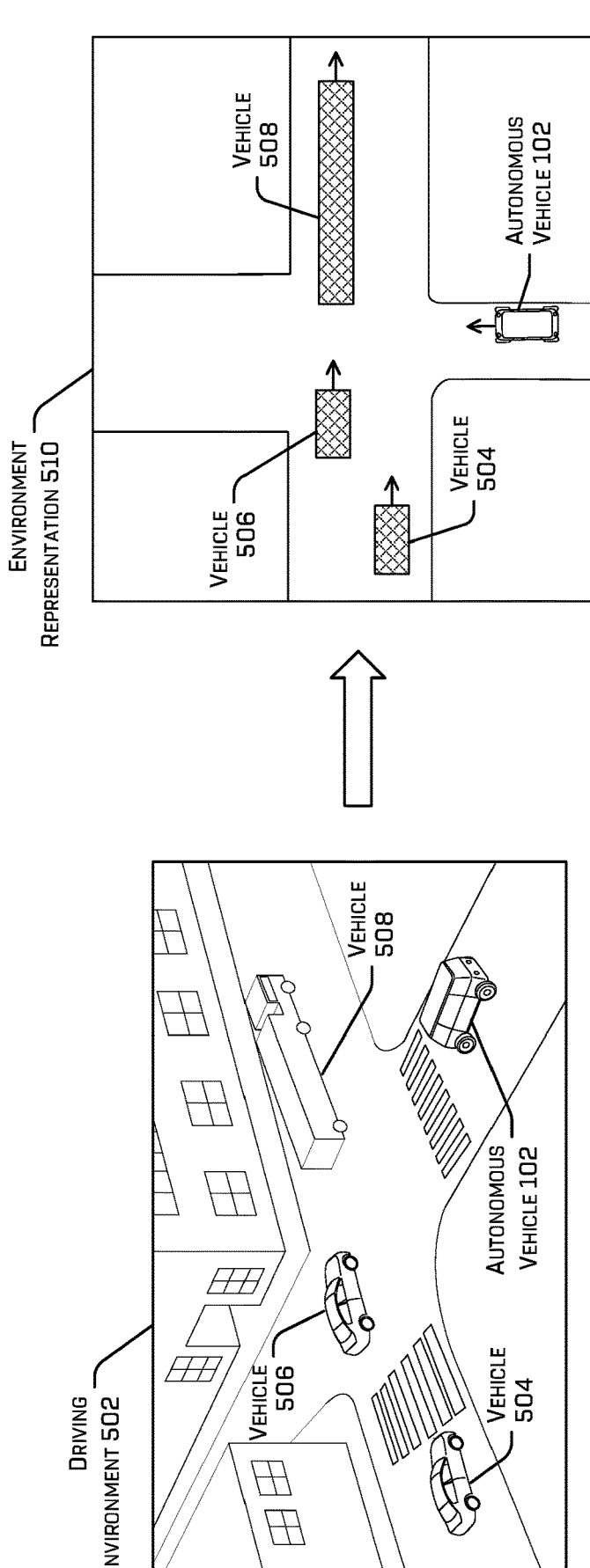
FIGS. 5A-5C illustrate examples of driving scene prediction associated with different candidate actions within a tree search, in accordance with one or more examples of the disclosure.
Figure 5B:
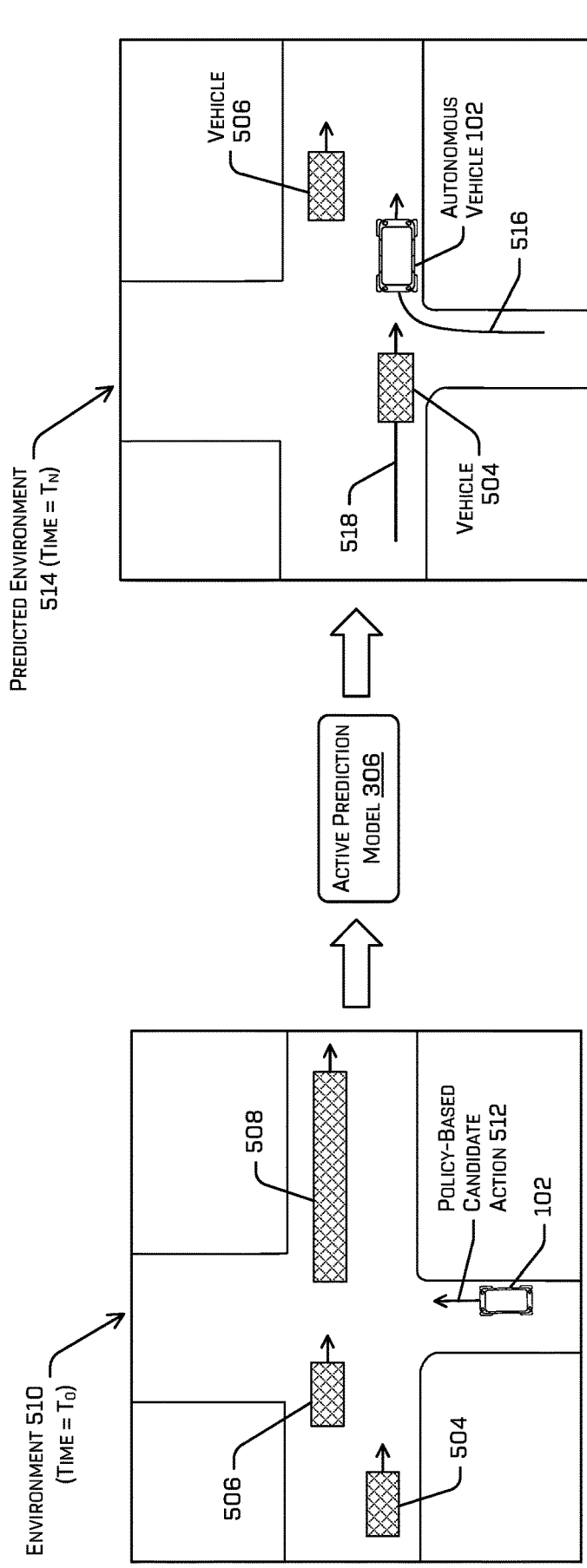
Figure 5C:
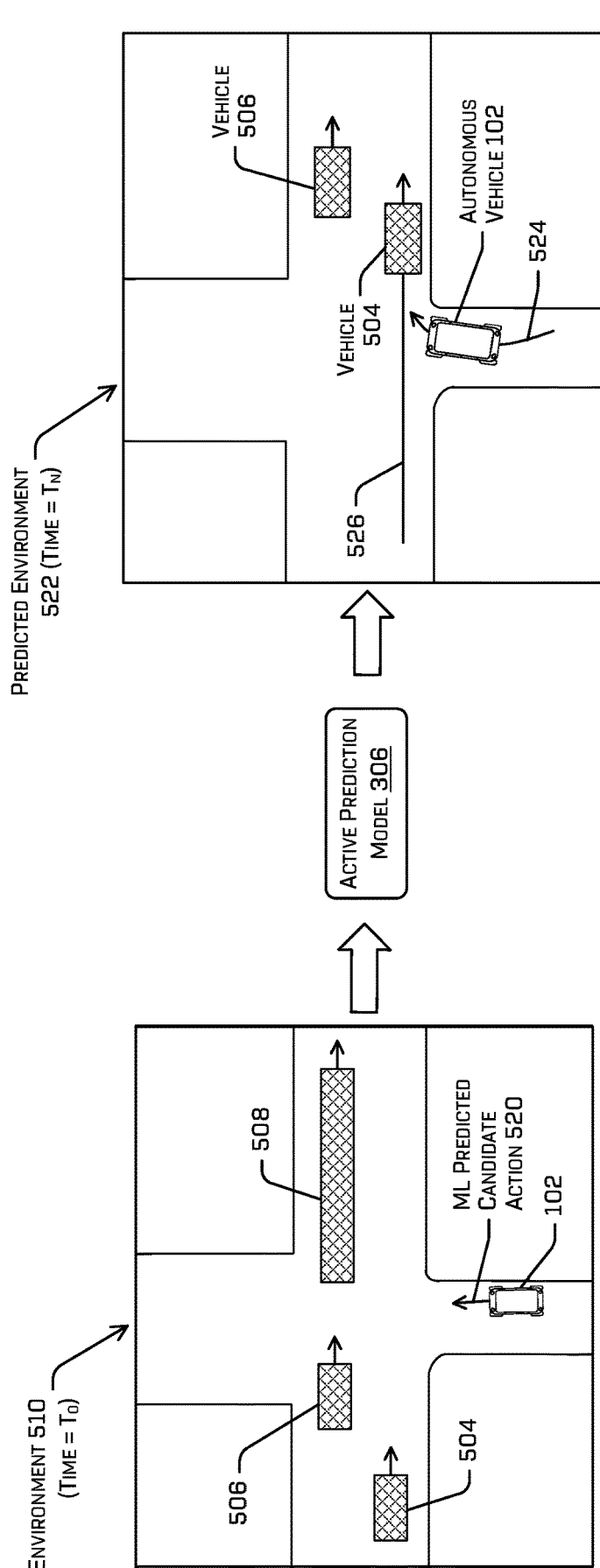

FIGS. 5A-5C depict examples of two different candidate actions and corresponding driving scene predictions, based on an initial representation of a driving environment including an autonomous vehicle 102. As described in these examples, a driving environment scene encoder 320 may generate an initial representation 510 (e.g., a scene encoding, and an active prediction model 306 may predict updated driving scenes and/or trajectories of the autonomous vehicle 102 and additional agents, based on the environment representation 510 and various candidate actions, which may include ML prediction-based candidate actions for the autonomous vehicle 102 and/or other heuristic-based predetermined candidate actions.

FIG. 5A illustrates an autonomous vehicle 102 capturing sensor data 502 of a driving environment. In various examples, the sensor data 502 may comprise any combination of image data, lidar data, radar data, sonar data, time-of-flight data, or other depth data. Based on the sensor data 502, and/or based on map data of the environment received from a map component, a driving environment scene encoder 320 may generate a representation 510 of the driving environment (e.g., a scene encoding). In this example, the sensor data 502 and environment representation 510 includes a representation of the autonomous vehicle 102, various static objects and environments features, and a number of other agent objects (e.g., vehicle 504, vehicle 506, and vehicle 508) perceived based on the sensor data 502. Although the representation 510 is depicted as a top-down representation in this example, it can be understood that in other examples the scene representation 510 may be represented as an entity-based and/or point-of-view representation from the perspective of the autonomous vehicle 102.

Additionally, although in these examples, the environment representation 510 (e.g., scene encoding or other representation) may be provided as input to the active prediction model 306, in other examples the active prediction model 306 may be configured to receive sets of the candidate actions and/or trajectories associated with the autonomous vehicle 102 and additional agents, and need not receive an environment representation 510 or any other representation of the driving environment.

FIG. 5B depicts the same driving scene in the representation 510 of the driving environment, including a first policy-based (e.g., heuristic-based) candidate action 512 for the autonomous vehicle 102. The candidate action 512 in this example may be a feasible trajectory representing a potential action for the autonomous vehicle 102 to state from the initiate vehicle state depicted in representation 510. The candidate action 512 may include, for example, a relative change in velocity and/or steering angle of the autonomous vehicle 102, that may be performed at the time (To) depicted in the representation 510. In some examples, the candidate action 512 may be a heuristics-based candidate action stored and/or determined by the search exploration policy component 308, using the various techniques described herein.

As shown in this example, the planning component 112 may invoke an active prediction model 306, providing as input to the model the representation 510 of the driving scene at an initial time point and the policy-based candidate action 512. Based on these inputs, the active prediction model 306 may output one or more predicted future trajectories for the autonomous vehicle 102 and/or the additional agents (e.g., vehicles 504 and 506), as shown in the predicted driving scene 514. In some examples, the active prediction model 306 may output predicted scene encodings representing the driving scene/environment as a whole, at any number of future time steps or intervals. Additionally or alternatively, the active prediction model 306 may output predicted trajectories for the various objects and need not output an entire predicted driving scene 514. Although this example depicts only the predicted states and trajectories for the autonomous vehicle 102 and vehicles 504 and 506, for clarity of the figure, it can be understood that the active prediction model 306 may output predicted trajectories and states for any or all objects in the driving scene.

The predicted driving scene 514 includes predicted updated states and predicted trajectories for the autonomous vehicle 102 and the vehicles 504 and 506 at a subsequent time ($T_n$) in the driving scene. In this example, based on the candidate action 512 used by the autonomous vehicle 102, the active prediction model 306 determined that the autonomous vehicle 102 is likely to follow a trajectory 516 to turn right in front of the vehicle 504, and that the vehicle 504 is likely to follow a trajectory 518 in which it slows and yields to allow the autonomous vehicle 102 to turn. As described above, the trajectory 516 for the autonomous vehicle 102 output by the active prediction model 306 need not follow the same course of the candidate action 512 that was input to active prediction model 306, based on the reactions and responses of the objects in the environment to the trajectories followed and other movements or actions taken by the other objects in the environment. Based on these predictions (and/or various other predicted trajectories and states from the active prediction model 306, such as predictions at different times before/after $T_n$, or alternative predictions with different confidences/probabilities, etc.), the cost evaluator 310 may compute costs associated with the trajectory 516 and/or the predicted driving scene 514 as a whole. In this example, the cost evaluator 310 may compute costs for the trajectory 516 based at least in part on safety scores of the individual predicted trajectories 516 and 518, a passenger comfort score and route progression for the predicted trajectory 516, and/or based on any potential interactions between the predicted trajectories 516 and 518 (e.g., the likelihood of an interaction, the safety/risk level of the interaction, aggression of the interaction, etc.). In particular, in this example, the candidate action 512 may potentially receive a lower score and/or a cost penalty for failing to yield the right-of-way to the oncoming vehicle 504 in the driving scene.

FIG. 5C depicts an alternative second driving scene 522 based on the same driving scene (e.g., driving environment representation 510), in which a second possible candidate action 520 for the autonomous vehicle 102 is determined and evaluated. As shown in the above example, the planning component 112 may invoke the active prediction model 306, providing as input to the model the representation 510 of the driving scene at the initial time point, and a second ML prediction-based candidate action 520. Based on these inputs, the active prediction model 306 may output predicted future trajectories for the autonomous vehicle 102 and the vehicle 504 (and/or any additional agents in the environment), as shown in the predicted driving scene 522.

In this example, the predicted driving scene 522 includes predicted updated states and predicted trajectories for the autonomous vehicle 102 and the vehicles 504 and 506 at the subsequent time ($T_n$) in the driving scene. In this example, based on the candidate action 520 used by the autonomous vehicle 102, the active prediction model 306 determined that the autonomous vehicle 102 is likely to follow a trajectory 524, in which it yields to the vehicle 504, and then proceeds to turn right after the vehicle 504 has moved through the interaction following trajectory 526. As in the above example, the predicted trajectory 524 for the autonomous vehicle 102 output by the active prediction model 306 need not follow the same course of the candidate action 520 that was input to active prediction model 306, based on the reactions and responses of the objects in the environment to the trajectories followed and other movements or actions taken by the other objects in the environment. Based on these predictions (and/or various other predicted trajectories and states from the active prediction model 306, such as predictions at different times before/after $T_n$, or alternative predictions with different confidences/probabilities, etc.), the cost evaluator 310 may compute costs associated with the trajectory 524 and/or the predicted driving scene 522 as a whole. In this example, the cost evaluator 310 may compute costs for the trajectory 524 based at least in part on safety scores of the individual predicted trajectories 524 and 526, a passenger comfort score and route progression for the predicted trajectory 524, and/or based on any potential interactions between the predicted trajectories 524 and 526

(e.g., the likelihood of an interaction, the safety/risk level of the interaction, aggression of the interaction, etc.). In particular, in this example, the ML prediction-based candidate action 520 may potentially receive a higher score and/or no cost penalty for yielding the right-of-way to the oncoming vehicle 504 in the driving scene.

FIG. 6 is a flow diagram illustrating an example process 600 for determining a vehicle trajectory using a tree search, including determining and evaluating a combination of heuristic-based candidate actions and ML prediction-based candidate actions during the tree search. As described herein, the operations of process 600 may be performed by a planning component 112, including various subcomponents and/or by invoking related components, operating within an autonomous vehicle 102.

At operation 602, the planning component 112 may receive (or determine) sensor data and determine a current vehicle state in a driving environment. In some examples, a tree search component 302 within the autonomous vehicle 102 may receive driving route data and sensor data associated with at least a start position in an environment. The start position may be associated with a current position/state of the autonomous vehicle 102, and the route may specify an end position/state, and may, in some examples, include intervening targets or operations. The sensor data received in operation 402 may include any of the sensor data associated with one or more sensors, according to any of the techniques discussed herein.

At operation 604, the planning component 112 may determine a tree structure root node associated with the start state of the autonomous vehicle 102. For example, the tree search component 302 may determine a root node and/or data structure for a tree search according to any of the techniques discussed herein. The root node may be associated with a current time and/or the most recent sensor data or batch of sensor data. As such, the root node may be associated with perception data that may identify environment state data that includes a current position, orientation, velocity, acceleration, classification, etc. of static and/or dynamic objects (including similar information for the vehicle, which may be generated by the localization component of the vehicle) in the environment and may additionally or alternatively include historical data of the same.

At operation 606, the planning component 112 may determine one or more ML prediction-based candidate actions that may be used to control the vehicle from the root node to one or more subsequent vehicle states in the environment. As described above, the candidate action generator 304 may use an active prediction model 306 to determine one or more ML prediction-based candidate actions in operation 606. ML prediction-based candidate actions may include actions determined using adaptive learning, machine learned models, and/or other prediction-based techniques, representing a prediction of the trajectory or state of the autonomous vehicle 102 at a future time step, based on the current state of the autonomous vehicle 102 and/or current environment state data.

At operation 608, the planning component 112 may determine one or more additional heuristic-based candidate actions that may be used to control the vehicle from the root node to one or more subsequent vehicle states in the environment. As described above, the heuristics-based candidate actions may represent general driving maneuvers and/or fine instructions including sets of vehicle control parameters (e.g., relative velocities, relative steering angles, etc.) that may be determined by the search exploration policy component 308. In some cases, heuristics-based candidate actions need not take into account the current state of the driving environment, including the current vehicle state, the state of the vehicle relative to the map data (e.g., current lane position, trajectory of the lane/roadway, current speed limit, etc.), and/or need not take into account the static and/or dynamic objects perceived by the vehicle's sensors.

At operation 610, the planning component 112 may compute costs associated with the candidate actions determined in operations 606 and 608, and in operation 612, the planning component 112 may determine one or more additional vehicle state nodes for exploration in the tree search based on the costs. In some examples, the planning component 112 may use a cost evaluator 310 for evaluating ML prediction-based candidate actions and/or heuristic-based candidate actions. Certain cost evaluations for candidate actions can be performed using the active prediction model 306 (e.g., based on the same ML prediction-based candidate actions/trajectories, and/or alternative heuristic-based candidate actions/trajectories). In various examples, the cost evaluator 310 may include various heuristics and/or ML-based components configured to detect and compute costs associated with potentially unsafe, illegal, or risky driving maneuvers. Additional costs determined by the cost evaluator 310 may include passenger comfort costs, route progress costs, etc. For these costs and the various other costs described herein, the cost evaluator 310 may be configured to evaluate the trajectories output by the active prediction model 306, including the predicted trajectory of the autonomous vehicle 102 and/or of the additional agents in the environment, and to compute cost values associated with the predicted trajectories, individually or in combination.

At operation 614, the planning component 112 may determine whether the next vehicle state node determined in operation 612 represents the end state of the driving route. As described above, the tree search component 302 may iteratively determine new nodes representing additional vehicle states, determine various candidate actions for the vehicle states, and evaluate the candidate actions using cost functions. Based on the evaluations of the candidate actions, the tree search component 302 may determine additional vehicle states based on the selected candidate actions, and continue the tree traversal repeated ending reaching the end state of the driving route.

Upon reaching the end state of the driving route (614: Yes), at operation 616 the tree search component 302 may determine and output the corresponding trajectory for the autonomous vehicle 102, based on the sequence of selected nodes through the tree structure. In various examples, the trajectory output in operation 616 may include a lowest-cost and/or optimal trajectory within the amount of the search space of possible trajectories that was explored during the tree search, and/or based on the cost metrics/thresholds used by the tree search component 302 to select candidate actions/vehicle states.

In contrast, when the end state of the driving route has not yet been reached (614: No), then process 600 may return to operation 606 to determine additional sets of candidate actions and/or additional selected vehicle state nodes within the remaining node layers of the search tree.

Figure 7:
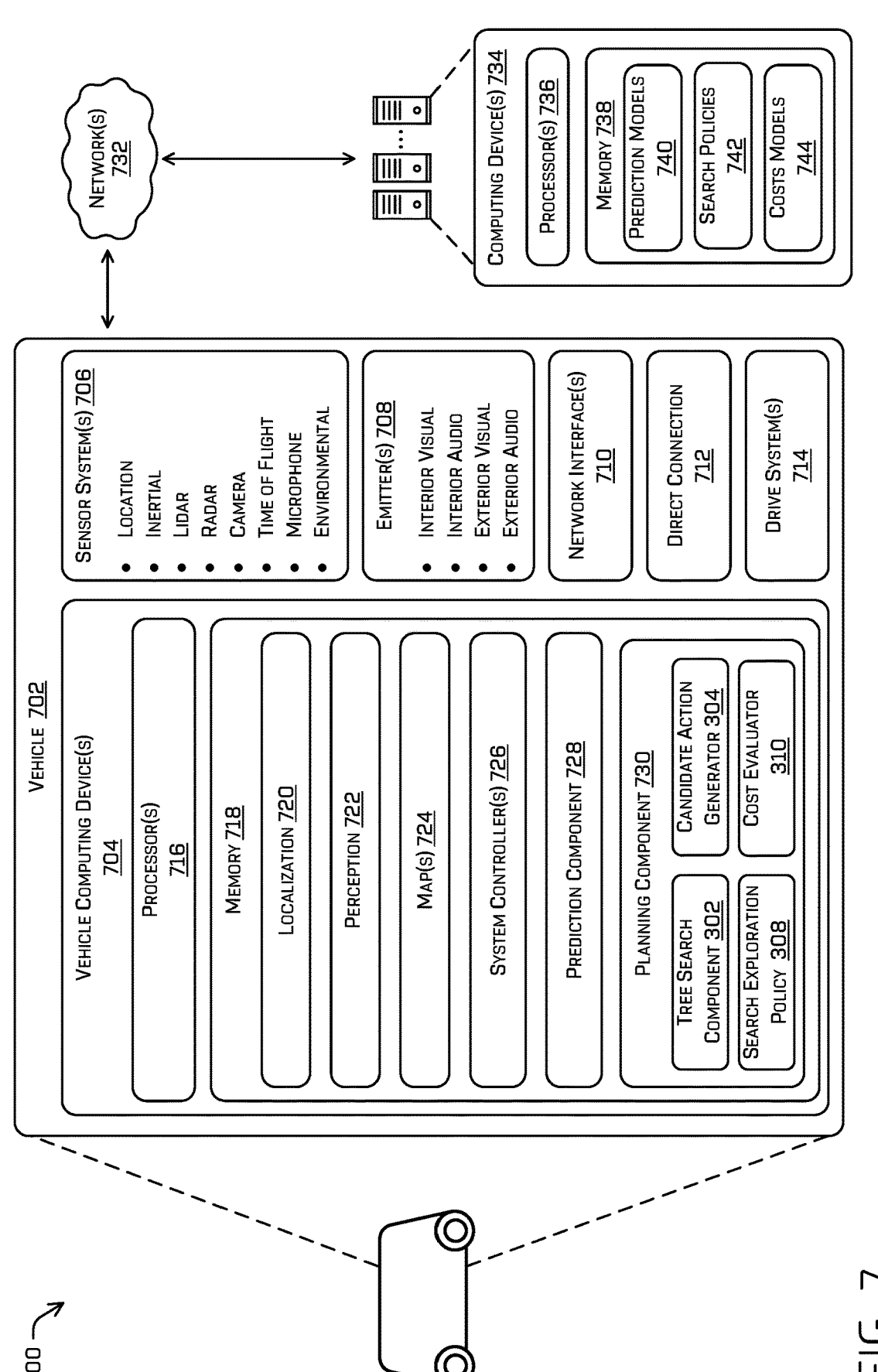
FIG. 7 is a block diagram illustrating an example system, including an autonomous vehicle and separate computing devices, for implementing various techniques described herein.

FIG. 7 is a block diagram of an example system 700 for implementing the techniques described herein. In at least one example, the system 700 may include a vehicle, such as vehicle 702. The vehicle 702 may include one or more vehicle computing devices 704, one or more sensor systems 706, one or more emitters 708, one or more network interfaces 710, at least one direct connection 712, and one or more drive systems 714.

The vehicle computing device 704 may include one or more processors 716 and memory 718 communicatively coupled with the processor(s) 716. In the illustrated example, the vehicle 702 is an autonomous vehicle; however, the vehicle 702 could be any other type of vehicle, such as a semi-autonomous vehicle, or any other system having driving trajectory planning/navigation functionality. For example, the vehicle 702 may be similar or identical to the autonomous vehicle 102 described above. In some instances, the autonomous vehicle 702 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 702 may be a fully or partially autonomous vehicle having any other level or classification.

In the illustrated example, the memory 718 of the vehicle computing device 704 stores a localization component 720, a perception component 722, one or more maps 724 (or map data), one or more system controllers 726, a prediction component 728, and a planning component 730 including a tree search component 302, a candidate action generator 304, a search exploration policy component 308, and a cost evaluator 310. Though depicted in FIG. 7 as residing in the memory 718 for illustrative purposes, it is contemplated that the localization component 720, the perception component 722, the maps 724, the system controllers 726, the prediction component 728, the planning component 730, the tree search component 302, the candidate action generator 304, the search exploration policy component 308, and/or the cost evaluator 310 may additionally, or alternatively, be accessible to the vehicle 702 (e.g., stored on, or otherwise accessible by, memory remote from the vehicle 702, such as, for example, memory 738 of one or more computing device(s) 734). In some examples, the memory 738 may include one or more prediction model(s) 740, one or more search policies 742, and/or one or more cost models/functions 744.

In at least one example, the localization component 720 may include functionality to receive sensor data from the sensor system(s) 706 to determine a position and/or orientation of the vehicle 702 (e.g., one or more of an x-, y-, z-position, roll, pitch, or yaw). For example, the localization component 720 may include and/or request/receive a map of an environment, such as from map(s) 724, and may continuously determine a location and/or orientation of the vehicle 702 within the environment. In some instances, the localization component 720 may utilize SLAM (simultaneous localization and mapping), CLAMS (calibration, localization and mapping, simultaneously), relative SLAM, bundle adjustment, non-linear least squares optimization, or the like to receive image data, lidar data, radar data, inertial measurement unit (IMU) data, GPS data, wheel encoder data, and the like to accurately determine a location of the vehicle 702. In some instances, the localization component 720 may provide data to various components of the vehicle 702 to determine an initial position of the vehicle 702 for determining the relevance of an object to the vehicle 702, as discussed herein.

In some instances, the perception component 722 may include functionality to perform object detection, segmentation, and/or classification. In some examples, the perception component 722 may provide processed sensor data that indicates a presence of an object (e.g., entity) that is proximate to the vehicle 702 and/or a classification of the object as an object type (e.g., car, pedestrian, cyclist, animal, building, tree, road surface, curb, sidewalk, unknown, etc.). In some examples, the perception component 722 may provide processed sensor data that indicates a presence of a stationary entity that is proximate to the vehicle 702 and/or a classification of the stationary entity as a type (e.g., building, tree, road surface, curb, sidewalk, unknown, etc.). In additional or alternative examples, the perception component 722 may provide processed sensor data that indicates one or more features associated with a detected object (e.g., a tracked object) and/or the environment in which the object is positioned. In some examples, features associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Features associated with the environment may include, but are not limited to, a presence of another object in the environment, a state of another object in the environment, a time of day, a day of a week, a season, a weather condition, an indication of darkness/light, etc.

The memory 718 may further include one or more maps 724 that may be used by the vehicle 702 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 702 may be controlled based at least in part on the map(s) 724. That is, the map(s) 724 may be used in connection with the localization component 720, the perception component 722, the prediction component 728, and/or the planning component 730 to determine a location of the vehicle 702, detect objects in an environment, generate routes, determine actions and/or trajectories to navigate within an environment.

In some examples, the one or more maps 724 may be stored on a remote computing device(s) (such as the computing device(s) 734) accessible via network(s) 732. In some examples, multiple maps 724 may be stored based on, for example, a characteristic (e.g., type of entity, time of day, day of week, season of the year, etc.). Storing multiple maps 724 may have similar memory requirements, but increase the speed at which data in a map may be accessed.

In at least one example, the vehicle computing device 704 may include one or more system controllers 726, which may be configured to control steering, propulsion, braking, safety, emitters, communication, and other systems of the vehicle 702. The system controller(s) 726 may communicate with and/or control corresponding systems of the drive system(s) 714 and/or other components of the vehicle 702.

The prediction component 728 may generate one or more probability maps representing prediction probabilities of possible locations of one or more objects in an environment. For example, the prediction component 728 may generate one or more probability maps for vehicles, pedestrians, animals, and the like within a threshold distance from the vehicle 702. In some instances, the prediction component 728 may measure a track of an object and generate a discretized prediction probability map, a heat map, a probability distribution, a discretized probability distribution, and/or a trajectory for the object based on observed and predicted behavior. In some instances, the one or more probability maps may represent an intent of the one or more objects in the environment.

In some examples, prediction component 728 may include one or more ML prediction models, such as the active prediction model 306 described above. The prediction component 728 may generate predicted trajectories of objects (e.g., objects) in an environment. For example, the prediction component 728 may generate one or more predicted trajectories for objects within a threshold distance from the vehicle 702. In some examples, the prediction component 728 may measure a trace of an object and generate a trajectory for the object based on observed and predicted behavior.

The planning component 730 may include various components and functionalities similar or identical to those of the planning component 112, described above. As discussed above, the planning component 730 may determine a trajectory for the vehicle 702 to follow to traverse through an environment. In various examples, the planning component 730 may determine various routes and trajectories and various levels of detail. For example, the planning component 730 may determine a route to travel from a first location (e.g., a current location) to a second location (e.g., a target location). For the purpose of this discussion, a route may include a sequence of waypoints for traveling between two locations. As non-limiting examples, waypoints include streets, intersections, global positioning system (GPS) coordinates, etc. Further, the planning component 730 may generate an instruction for guiding the vehicle 702 along at least a portion of the route from the first location to the second location. In at least one example, the planning component 730 may determine how to guide the vehicle 702 from a first waypoint in the sequence of waypoints to a second waypoint in the sequence of waypoints. In some examples, the instruction may be a candidate trajectory, or a portion of a trajectory. In some examples, multiple trajectories may be substantially simultaneously generated (e.g., within technical tolerances) in accordance with a receding horizon technique. A single trajectory of the multiple trajectories in a receding data horizon having the highest confidence level may be selected to operate the vehicle. In various examples, the planning component 730 may select a trajectory for the vehicle 702.

In other examples, the planning component 730 may alternatively, or additionally, use data from the localization component 720, the perception component 722, map(s) 724, and/or the prediction component 728 to determine a trajectory for the vehicle 702 to follow to traverse through an environment. For example, the planning component 730 may receive data (e.g., object data) from the localization component 720, the perception component 722, and/or the prediction component 728 regarding objects associated with an environment. In some examples, the planning component 730 receives data for relevant objects within the environment. Using this data, the planning component 730 may determine a route to travel from a first location (e.g., a current location) to a second location (e.g., a target location)

to avoid objects in an environment. In at least some examples, such a planning component 730 may determine there is no such collision-free trajectory and, in turn, provide a trajectory that brings the vehicle 702 to a safe stop avoiding all collisions and/or otherwise mitigating damage.

In some instances, aspects of some or all of the components discussed herein may include any models, techniques, and/or machine learned techniques. For example, in some instances, the components in the memory 718 (and the memory 738, discussed below) may be implemented as a neural network.

As described herein, an exemplary neural network is a technique which passes input data through a series of connected layers to produce an output. Each layer in a neural network may also comprise another neural network, or may comprise any number of layers (whether convolutional or not). As may be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the sensor system(s) 706 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 706 may include multiple instances of each of these or other types of sensors. For instance, the lidar sensors may include individual lidar sensors located at the corners, front, back, sides, and/or top of the vehicle 702. As another example, the camera sensors may include multiple cameras disposed at various locations about the exterior and/or interior of the vehicle 702. The sensor system(s) 706 may provide input to the vehicle computing device 704. Additionally, or in the alternative, the sensor system(s) 706 may send sensor data, via the one or more networks 732, to the one or more computing device(s) 734 at a particular frequency, after a lapse of a predetermined period of time, in near real-time, etc.

The vehicle 702 may also include one or more emitters 708 for emitting light and/or sound. The emitter(s) 708 may include interior audio and visual emitters to communicate with passengers of the vehicle 702. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 708 may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 702 may also include one or more network interfaces 710 (or communication connections) that enable communication between the vehicle 702 and one or more other local or remote computing device(s). For instance, the network interfaces 710 may facilitate communication with other local computing device(s) on the vehicle 702 and/or the drive system(s) 714. Also, the network interface(s) 710 may allow the vehicle to communicate with other nearby computing device(s) (e.g., computing device(s) 734, other nearby vehicles, etc.) and/or one or more remote sensor system(s) for receiving sensor data. The network interface(s) 710 also may enable the vehicle 702 to communicate with a remote teleoperations computing device or other remote services.

The network interface(s) 710 may include physical and/or logical interfaces for connecting the vehicle computing device 704 to another computing device or a network, such as network(s) 732. For example, the network interface(s) 710 may enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 702 may include one or more drive systems 714. In some examples, the vehicle 702 may have a single drive system 714. In at least one example, if the vehicle 702 has multiple drive systems 714, individual drive systems 714 may be positioned on opposite ends of the vehicle 702 (e.g., the front and the rear, etc.). In at least one example, the drive system(s) 714 may include one or more sensor systems to detect conditions of the drive system(s) 714 and/or the surroundings of the vehicle 702. By way of example and not limitation, the sensor system(s) may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, lidar sensors, radar sensors, etc. Some sensors, such as the wheel encoders may be unique to the drive system(s) 714. In some cases, the sensor system(s) on the drive system(s) 714 may overlap or supplement corresponding systems of the vehicle 702 (e.g., sensor system(s) 706).

The drive system(s) 714 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 714 may include a drive module controller which may receive and preprocess data from the sensor system(s) and to control operation of the various vehicle systems. In some examples, the drive module controller may include one or more processors and memory communicatively coupled with the one or more processors. The memory may store one or more modules to perform various functionalities of the drive system(s) 714. Furthermore, the drive system(s) 714 may also include one or more communication connection(s) that enable communication by the respective drive module with one or more other local or remote computing device(s).

In at least one example, the direct connection 712 may provide a physical interface to couple the one or more drive system(s) 714 with the body of the vehicle 702. For example, the direct connection 712 may allow the transfer of energy, fluids, air, data, etc. between the drive system(s) 714 and the vehicle. In some instances, the direct connection 712 may further releasably secure the drive system(s) 714 to the body of the vehicle 702.

In at least one example, the localization component 720, the perception component 722, the maps 724, the system controllers 726, the prediction component 728, the planning component 730, the tree search component 302, the candidate action generator 304, the search exploration policy component 308, and/or the cost evaluator 310 may process sensor data, as described above, and may send their respective outputs, over the one or more network(s) 732, to the computing device(s) 734. In at least one example, the localization component 720, the perception component 722, the maps 724, the system controllers 726, the prediction component 728, the planning component 730, the tree search component 302, the candidate action generator 304, the search exploration policy component 308, and/or the cost evaluator 310 may send their respective outputs to the computing device(s) 734 at a particular frequency, after a lapse of a predetermined period of time, in near real-time, etc.

In some examples, the vehicle 702 may send sensor data to the computing device(s) 734 via the network(s) 732. In some examples, the vehicle 702 may receive sensor data from the computing device(s) 734 and/or remote sensor system(s) via the network(s) 732. The sensor data may include raw sensor data and/or processed sensor data and/or representations of sensor data. In some examples, the sensor data (raw or processed) may be sent and/or received as one or more log files.

The computing device(s) 734 may include processor(s) 736 and a memory 738, which may include one or more prediction model(s) 740, one or more search policies 742, and/or one or more cost models/functions 744. In some examples, computing device(s) 734 may store various prediction model(s) 740, search policies 742, and/or cost models/functions 744, which may be associated with various different models of autonomous vehicles (e.g., having different capabilities and kino-dynamically feasible trajectories), different driving environments (e.g., regions, driving scene types, etc.), and/or different driving conditions (e.g., traffic conditions, road conditions, weather conditions, etc.). In such examples, the computing device(s) 734 may be configured to provide various combinations of ML-based prediction models, search exploration policies, and/or cost evaluator component(s) to various different vehicles (e.g., 702), depending on the type, model, features, current driving environment, current driving conditions, etc., of the vehicles. Additionally, in some examples, the memory 738 may store one or more of components that are similar to the component(s) stored in the memory 718 of the vehicle 702. In such examples, the computing device(s) 734 may be configured to perform one or more of the processes described herein with respect to the vehicle 702.

The processor(s) 716 of the vehicle 702 and the processor(s) 736 of the computing device(s) 734 may be any suitable processor capable of executing instructions to process data and perform operations as described herein. By way of example and not limitation, the processor(s) may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 718 and memory 738 are examples of non-transitory computer-readable media. The memory 718 and memory 738 may store an operating system and one or more software applications, instructions, programs, and/or data to implement the methods described herein and the functions attributed to the various systems. In various implementations, the memory may be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

It should be noted that while FIG. 7 is illustrated as a distributed system, in alternative examples, components of the vehicle 702 may be associated with the computing device(s) 734 and/or components of the computing device(s) 734 may be associated with the vehicle 702. That is, the vehicle 702 may perform one or more of the functions associated with the computing device(s) 734, and vice versa.

The methods described herein represent sequences of operations that may be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes. In some examples, one or more operations of the method may be omitted entirely. For instance, the operations may include determining a first action and a second action by the vehicle relative to a selected trajectory without determining a respective cost for one or more of the actions by the vehicle. Moreover, the methods described herein may be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

EXAMPLE CLAUSES

A. A vehicle comprising: one or more processors; and one or more non-transitory computer-readable media storing computer-executable instructions that, when executed, cause the one or more processors to perform operations comprising: receiving route data associated with a start position and an end position in an environment; generating a tree structure by: associating a current state of the vehicle with a first node of the tree structure; determining, based on a search exploration policy, a first candidate action for controlling motion of the vehicle relative to the first node; inputting, into a machine learned model, a representation of the environment associated with the first node; and receiving, from the machine learned model, a second candidate action for controlling motion of the vehicle relative to the first node; determining a control trajectory based at least in part on a cost associated with a set of connected nodes in the tree structure having a minimum cost; and controlling the vehicle in the environment, based at least in part on the control trajectory.

B. The vehicle of paragraph A, wherein the first or second candidate action comprises one or more of: a follow action, a stay in lane action, a change lane action, or a turn action.

C. The vehicle of paragraph A, wherein the cost is associated with one or more of: a safety cost, a progress cost, a comfort cost, an energy efficiency cost, or a law abidance cost.

D. The vehicle of paragraph A, wherein the machine learned model comprises a first machine learned model and the representation of the environment comprises an embedding, the operations further comprising: inputting, into a second machine learned model, the embedding; receiving, from the second machine learned model, a predicted object trajectory associated with an object in the environment, wherein the second candidate action is based at least in part on the predicted object trajectory.

E. The vehicle of paragraph A, wherein generating the tree structure further comprises: selecting, based at least in part on the cost, the second candidate action for further exploration in the tree structure; associating the second candidate action with a second node of the tree structure; determining, based on the search exploration policy, a third candidate action for controlling motion of the vehicle relative to the second node; inputting, into the machine learned model, a second representation of the environment associated with the second node; and receiving, from the machine learned model, a fourth candidate action for controlling motion of the vehicle relative to the second node.

F. A method comprising: receiving, from the machine learned model, a first candidate action for controlling motion of a vehicle in the environment; generating, based at least in part on the first candidate action and a second candidate action, a tree structure; determining a control trajectory for the vehicle, based at least in part on the tree structure; and controlling the vehicle in the environment, based at least in part on the control trajectory.

G. The method of paragraph F, wherein determining the control trajectory comprises determining a traversal of the tree structure associated with a minimum cost.

H. The method of paragraph F, further comprising: determining, based at least in part on the environment, a tree search exploration policy; and determining the second candidate action based at least in part on the tree search exploration policy.

I. The method of paragraph F, wherein generating the tree structure comprises: associating a current state of the vehicle with a first node of the tree structure; selecting, based at least in part on a cost, the first candidate action for further exploration in the tree structure; associating the first candidate action with a second node of the tree structure; inputting, into the machine learned model, a second representation of the environment associated with the second node; and receiving, from the machine learned model, a third candidate action for controlling motion of the vehicle relative to the second node.

J. The method of paragraph F, wherein the machine learned model is a first machine learned model, the method further comprising: inputting the representation of the environment into a second machine learned model; and receiving, from the second machine learned model, a predicted object trajectory associated with an object in the environment, wherein the first candidate action is based at least in part on the predicted object trajectory.

K. The method of paragraph F, wherein generating the tree structure comprises: associating a current state of the vehicle with a first node of the tree structure; determining a confidence level associated with the first candidate action received from the machine learned model; and determining, based at least in part on the confidence level, a number of additional candidate actions associated with the first node of the tree structure.

L. The method of paragraph F, further comprising: determining a tree search exploration policy based at least in part on a node level of the node in a tree structure, wherein the tree search exploration policy comprises a number of candidate actions; and determining the second candidate action based at least in part on the tree search exploration policy.

M. The method of paragraph F, wherein the machine learned model is at least one of: an imitation vehicle trajectory model, trained based on at least in part on vehicle log data; a reinforced learning vehicle trajectory model, trained using a first value maximization function; or an inverse reinforced learning vehicle trajectory model, trained using a second value maximization function.

N. The method of paragraph F, wherein inputting the representation of the environment into the machine learned model comprises: determining an input to the machine learned model, based at least in part on: a static representation of the environment; a predicted vehicle state of the vehicle at a time associated with a node of the tree structure; and a predicted agent state of an agent in the environment at the time associated with the node of the tree structure.

O. One or more non transitory computer readable media storing instructions executable by a processor, wherein the instructions, when executed, cause the processor to perform operations comprising: inputting, into a machine learned model, a representation of an environment; receiving, from the machine learned model, a first candidate action for controlling motion of a vehicle in the environment; generating, based at least in part on the first candidate action and a second candidate action, a tree structure; determining a control trajectory for the vehicle, based at least in part on the tree structure; and controlling the vehicle in the environment, based at least in part on the control trajectory.

P. The one or more non transitory computer readable media of paragraph O, the operations further comprising: determining, based at least in part on the environment, a tree search exploration policy; and determining the second candidate action based at least in part on the tree search exploration policy.

Q. The one or more non transitory computer readable media of paragraph O, wherein generating the tree structure comprises: associating a current state of the vehicle with a first node of the tree structure; selecting, based at least in part on a cost, the first candidate action for further exploration in the tree structure; associating the first candidate action with a second node of the tree structure; inputting, into the machine learned model, a second representation of the environment associated with the second node; and receiving, from the machine learned model, a third candidate action for controlling motion of the vehicle relative to the second node.

R. The one or more non transitory computer readable media of paragraph O, wherein the machine learned model is a first machine learned model, the operations further comprising: inputting the representation of the environment into a second machine learned model; and receiving, from the second machine learned model, a predicted object trajectory associated with an object in the environment, wherein the first candidate action is based at least in part on the predicted object trajectory.

S. The one or more non transitory computer readable media of paragraph O, wherein generating the tree structure comprises: associating a current state of the vehicle with a first node of the tree structure; determining a confidence level associated with the first candidate action received from the machine learned model; and determining, based at least in part on the confidence level, a number of additional candidate actions associated with the first node of the tree structure.

T. The one or more non transitory computer readable media of paragraph O, the operations further comprising: determining a tree search exploration policy based at least in part on a node level of the node in a tree structure, wherein the tree search exploration policy comprises a number of candidate actions; and determining the second candidate action based at least in part on the tree search exploration policy.

While the example clauses described above are described with respect to particular implementations, it should be understood that, in the context of this document, the content of the example clauses can be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A vehicle comprising:
one or more processors; and
one or more non-transitory computer-readable media storing computer-executable instructions that, when executed, cause the one or more processors to perform operations comprising:
receiving route data associated with a start position and an end position in an environment;
generating a tree structure by:
associating a current state of the vehicle with a first node of the tree structure;
inputting, into a machine learned model, a representation of the environment associated with the first node;
generating, using the machine learned model, a first candidate action for controlling motion of the vehicle relative to the first node;
determining, based at least in part on a heuristic, a second candidate action for controlling motion of the vehicle relative to the first node, wherein the second candidate action is distinct from the first candidate action;
creating a set of connected nodes of the tree structure based at least in part on the first candidate action and the second candidate action, wherein the first node is a parent node and the first and second candidate actions correspond to child nodes associated with the first node;
determining, using the tree structure, a control trajectory based at least in part on a cost associated with the set of connected nodes in the tree structure relative to the first node having a minimum cost; and controlling the vehicle in the environment, based at least in part on the control trajectory.

2. The vehicle of claim 1, wherein the first or second candidate action comprises one or more of:

a follow action, a stay in lane action, a change lane action, or a turn action.

3. The vehicle of claim 1, wherein the cost is associated with one or more of:

a safety cost, a progress cost, a comfort cost, an energy efficiency cost, or a law abidance cost.

4. The vehicle of claim 1, wherein the machine learned model comprises a first machine learned model and the representation of the environment comprises an embedding, the operations further comprising:

inputting, into a second machine learned model, the embedding; and receiving, from the second machine learned model, a predicted object trajectory associated with an object in the environment, and wherein the first candidate action is based at least in part on the predicted object trajectory.

5. The vehicle of claim 1, wherein generating the tree structure further comprises:

selecting, based at least in part on the cost, the first candidate action for further exploration in the tree structure;

associating the first candidate action with a second node of the tree structure;

determining a third candidate action for controlling motion of the vehicle relative to the second node;

inputting, into the machine learned model, a second representation of the environment associated with the second node;

receiving, from the machine learned model, a fourth candidate action for controlling motion of the vehicle relative to the second node; and updating the set of connected nodes of the tree structure based at least in part on the third candidate action and the fourth candidate action.

6. A method comprising:

inputting, into a machine learned model, a representation of an environment;

generating, using the machine learned model, a first candidate action for controlling motion of a vehicle in the environment;

determining, based at least in part on at least one heuristic, a second candidate action for controlling motion of the vehicle in the environment;

generating, based at least in part on the first candidate action and the second candidate action, a tree structure, wherein the tree structure comprises a parent node;

creating a set of connected nodes of the tree structure based at least in part on the first candidate action and the second candidate action, wherein the first and second candidate actions correspond to child nodes of the set of connected nodes and are associated with the parent node;

determining a control trajectory for the vehicle, using the tree structure, based at least in part on determining a minimum cost traversal associated with the set of connected nodes in the tree structure; and controlling the vehicle in the environment, based at least in part on the control trajectory.

7. The method of claim 6, further comprising:

determining, based at least in part on the environment, a tree search exploration policy; and determining the second candidate action based at least in part on the tree search exploration policy.

8. The method of claim 6, wherein generating the tree structure comprises:

associating a current state of the vehicle with a first node of the tree structure;

selecting, based at least in part on a cost, the first candidate action for further exploration in the tree structure;

associating the first candidate action with a second node of the tree structure;

inputting, into the machine learned model, a second representation of the environment associated with the second node; and receiving, from the machine learned model, a third candidate action for controlling motion of the vehicle relative to the second node.

9. The method of claim 6, wherein generating the tree structure comprises:

associating a current state of the vehicle with a first node of the tree structure;

determining a confidence level associated with the first candidate action received from the machine learned model; and determining, based at least in part on the confidence level, a number of additional candidate actions associated with the first node of the tree structure.

10. The method of claim 6, further comprising:

determining a tree search exploration policy based at least in part on a node level of a node in the tree structure, wherein the tree search exploration policy comprises a number of candidate actions; and determining the second candidate action based at least in part on the tree search exploration policy.

11. The method of claim 6, wherein the machine learned model is at least one of:

an imitation vehicle trajectory model, trained based on at least in part on vehicle log data;

a reinforced learning vehicle trajectory model, trained using a first value maximization function; or an inverse reinforced learning vehicle trajectory model, trained using a second value maximization function.

12. The method of claim 6, wherein:

the machine learned model is trained to output a predicted trajectory of the vehicle, based at least in part on the representation of the environment; and the first candidate action is based at least in part on the predicted trajectory.

13. The method of claim 12, wherein:

the representation of the environment into to the machine learned model is based at least in part on:

a static representation of the environment at a first time associated with a first node of the tree structure;

a vehicle state of the vehicle at the first time associated with the first node; and an agent state of an agent in the environment at the first time associated with the first node, and an output of the machine learned model comprises:

a predicted vehicle state of the vehicle at a second time associated with a second node of the tree structure; and a predicted agent state of an agent in the environment at the second time associated with the second node of the tree structure.

14. The method of claim 6, wherein:

the first candidate action is determined subsequent to receiving the representation of the environment; and the second candidate action is determined, based at least in part on a search exploration policy, prior to receiving the representation of the environment.

15. The method of claim 6, wherein:

a current state of the vehicle is associated with a root node of the tree structure;

the first candidate action is associated with a first action node of the tree structure; and the second candidate action is associated with a second action node of the tree structure.

16. One or more non-transitory computer-readable media storing instructions executable by a processor, wherein the instructions, when executed, cause the processor to perform operations comprising:

inputting, into a machine learned model, a representation of an environment;

generating, using the machine learned model, a first candidate action for controlling motion of a vehicle in the environment;

determining, based at least in part on at least one heuristic, a second candidate action for controlling motion of the vehicle in the environment;

generating, based at least in part on the first candidate action and the second candidate action, a tree structure, wherein the tree structure comprises a parent node;

creating a set of connected nodes of the tree structure based at least in part on the first candidate action and the second candidate action, wherein the first and second candidate actions correspond to child nodes of the set of connected nodes and are associated with the parent node;

determining a control trajectory for the vehicle, using the tree structure, based at least in part on determining a minimum cost traversal associated with the set of connected nodes in the tree structure; and controlling the vehicle in the environment, based at least in part on the control trajectory.

17. The one or more non-transitory computer-readable media of claim 16, the operations further comprising:

determining, based at least in part on the environment, a tree search exploration policy; and determining the second candidate action based at least in part on the tree search exploration policy.

18. The one or more non-transitory computer-readable media of claim 16, wherein generating the tree structure comprises:

associating a current state of the vehicle with a first node of the tree structure;

selecting, based at least in part on a cost, the first candidate action for further exploration in the tree structure;

associating the first candidate action with a second node of the tree structure;

inputting, into the machine learned model, a second representation of the environment associated with the second node; and receiving, from the machine learned model, a third candidate action for controlling motion of the vehicle relative to the second node.

19. The one or more non-transitory computer-readable media of claim 16, wherein generating the tree structure comprises:

associating a current state of the vehicle with a first node of the tree structure;

determining a confidence level associated with the first candidate action received from the machine learned model; and determining, based at least in part on the confidence level, a number of additional candidate actions associated with the first node of the tree structure.

20. The one or more non-transitory computer-readable media of claim 16, the operations further comprising:

determining a tree search exploration policy based at least in part on a node level of a node in the tree structure, wherein the tree search exploration policy comprises a number of candidate actions; and determining the second candidate action based at least in part on the tree search exploration policy.

* * * * *